US009331320B2

(12) United States Patent
Whitacre et al.

(10) Patent No.: US 9,331,320 B2
(45) Date of Patent: *May 3, 2016

(54) LARGE FORMAT ELECTROCHEMICAL ENERGY STORAGE DEVICE HOUSING AND MODULE

(71) Applicant: AQUION ENERGY, INC., Pittsburgh, PA (US)

(72) Inventors: Jay Whitacre, Pittsburgh, PA (US); David Blackwood, Pittsburgh, PA (US); Eric Weber, Pittsburgh, PA (US); Wenzhuo Yang, Pittsburgh, PA (US); Eric Sheen, Pittsburgh, PA (US); William Campbell, Pittsburgh, PA (US); Don Humphreys, Pittsburgh, PA (US); Edward Lynch-Bell, Pittsburgh, PA (US)

(73) Assignee: AQUION ENERGY INC., Pittsburgh, PA (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/178,062

(22) Filed: Feb. 11, 2014

(65) Prior Publication Data
US 2014/0162090 A1     Jun. 12, 2014

Related U.S. Application Data

(63) Continuation of application No. 13/666,452, filed on Nov. 1, 2012, now Pat. No. 8,652,672.

(60) Provisional application No. 61/611,416, filed on Mar. 15, 2012.

(51) Int. Cl.
*H01M 2/10*     (2006.01)
*H01M 12/00*     (2006.01)

(52) U.S. Cl.
CPC .......... *H01M 2/1077* (2013.01); *H01M 12/005* (2013.01); *H01M 2220/10* (2013.01); *Y10T 29/49114* (2015.01)

(58) Field of Classification Search
CPC ...... H01M 2/10; H01M 2/1077; H01M 2/005
USPC ........... 429/163–187, 149–160, 129–147, 99, 429/247–255; 180/65.1, 65.21, 68.5; 29/623.4; 221/282
See application file for complete search history.

(56) References Cited

U.S. PATENT DOCUMENTS 3,995,008 A    11/1976   Spiegelberg
4,100,332 A     7/1978   Carr
(Continued)

FOREIGN PATENT DOCUMENTS

CN           101154745       4/2008
JP        2000-331682 A    11/2000
(Continued)

OTHER PUBLICATIONS

European Office Communication and Search Report for EP Application No. 13761001.0, dated Aug. 25, 2015, 30 pages.
(Continued)

*Primary Examiner* — Patrick Ryan
*Assistant Examiner* — Kiran Quraishi
(74) *Attorney, Agent, or Firm* — The Marbury Law Group PLLC

(57) ABSTRACT

An assembly includes non-load bearing housings, each housing including several cavities. Each cavity includes a stack of freely stacked electrochemical storage cells in the housings. Each electrochemical storage cell includes an anode electrode, a cathode electrode, and a separator located between the anode electrode and the cathode electrode. The assembly is configured such that pressure applied to the assembly is born by the freely stacked electrochemical storage cells.

20 Claims, 28 Drawing Sheets

(56) References Cited

U.S. PATENT DOCUMENTS

| | | |
|---|---|---|
| 4,144,381 A | 3/1979 | Fatica |
| 4,246,253 A | 1/1981 | Hunter |
| 4,343,868 A | 8/1982 | Putt |
| 4,540,639 A | 9/1985 | Grimes |
| 4,623,597 A | 11/1986 | Sapru et al. |
| 4,849,309 A | 7/1989 | Redey et al. |
| 5,121,301 A | 6/1992 | Kurabayashi et al. |
| 5,142,451 A | 8/1992 | Kurabayashi et al. |
| 5,316,877 A | 5/1994 | Thackeray et al. |
| 5,392,873 A | 2/1995 | Masuyama et al. |
| 5,419,977 A | 5/1995 | Weiss et al. |
| 5,525,442 A | 6/1996 | Shuster |
| 5,558,961 A | 9/1996 | Doeff et al. |
| 5,567,544 A | 10/1996 | Lyman |
| 5,793,603 A | 8/1998 | Lyman |
| 5,858,573 A | 1/1999 | Abraham et al. |
| 5,882,573 A | 3/1999 | Kwok et al. |
| 5,958,624 A | 9/1999 | Frech et al. |
| 6,017,654 A | 1/2000 | Kumta et al. |
| 6,040,089 A | 3/2000 | Manev et al. |
| 6,159,637 A | 12/2000 | Shizuka et al. |
| 6,162,559 A | 12/2000 | Vutetakis et al. |
| 6,248,477 B1 | 6/2001 | Howard, Jr. et al. |
| 6,252,762 B1 | 6/2001 | Amatucci |
| 6,255,015 B1 | 7/2001 | Corrigan et al. |
| 6,267,943 B1 | 7/2001 | Manev et al. |
| 6,310,762 B1 | 10/2001 | Okamura et al. |
| 6,322,744 B1 | 11/2001 | Kelley et al. |
| 6,325,988 B1 | 12/2001 | Inoue et al. |
| 6,383,683 B1 | 5/2002 | Nagayama et al. |
| 6,413,673 B1 | 7/2002 | Kasai et al. |
| 6,423,294 B2 | 7/2002 | Manev et al. |
| 6,455,187 B1 | 9/2002 | Tomazic |
| 6,465,129 B1 | 10/2002 | Xu et al. |
| 6,517,972 B1 | 2/2003 | Amatucci |
| 6,531,220 B1 | 3/2003 | Kweon et al. |
| 6,551,741 B1 | 4/2003 | Hamada et al. |
| 6,569,561 B1 | 5/2003 | Kimura et al. |
| 6,599,657 B1 | 7/2003 | Pollett et al. |
| 6,599,662 B1 | 7/2003 | Chiang et al. |
| 6,670,076 B1 | 12/2003 | Iwata et al. |
| 6,673,491 B2 | 1/2004 | Shirakawa et al. |
| 6,692,665 B2 | 2/2004 | Shima et al. |
| 6,738,252 B2 | 5/2004 | Okamura et al. |
| 6,757,154 B2 | 6/2004 | Reynolds, III et al. |
| 6,759,165 B2 | 7/2004 | Tsuruta et al. |
| 6,783,893 B2 | 8/2004 | Bowden et al. |
| 6,787,232 B1 | 9/2004 | Chiang et al. |
| 6,814,894 B2 | 11/2004 | Shoji et al. |
| 6,824,923 B2 | 11/2004 | Che et al. |
| 6,869,547 B2 | 3/2005 | Barker et al. |
| 6,872,492 B2 | 3/2005 | Barker et al. |
| 7,008,726 B2 | 3/2006 | Adamson et al. |
| 7,041,239 B2 | 5/2006 | Barker et al. |
| 7,056,486 B2 | 6/2006 | Park et al. |
| 7,087,346 B2 | 8/2006 | Barker et al. |
| 7,199,997 B1 | 4/2007 | Lipka et al. |
| 7,211,348 B2 | 5/2007 | Wadley et |
| 7,214,448 B2 | 5/2007 | Barker et al. |
| 7,283,349 B2 | 10/2007 | Yoshida et al. |
| 7,291,421 B2 | 11/2007 | Kimura et al. |
| 7,335,444 B2 | 2/2008 | Numata et al. |
| 7,507,500 B2 | 3/2009 | Donnelly et al. |
| 7,547,487 B1 | 6/2009 | Smith et al. |
| 7,713,505 B2 | 5/2010 | Herbst |
| 7,785,740 B2 | 8/2010 | Amine et al. |
| 7,855,011 B2 | 12/2010 | Meschter |
| 7,920,371 B2 | 4/2011 | Mitchell et al. |
| 8,003,260 B2 | 8/2011 | Exnar et al. |
| 8,129,052 B2 | 3/2012 | Visco et al. |
| 8,137,830 B2 | 3/2012 | Whitacre |
| 8,169,773 B2 | 5/2012 | Lee et al. |
| 8,298,701 B2 | 10/2012 | Whitacre et al. |
| 8,652,672 B2 | 2/2014 | Whitacre et al. |
| 2002/0009645 A1 | 1/2002 | Shima et al. |
| 2002/0048706 A1 | 4/2002 | Mayes et al. |
| 2002/0182502 A1 | 12/2002 | Park et al. |
| 2003/0035999 A1 | 2/2003 | Gao et al. |
| 2003/0186128 A1 | 10/2003 | Singh et al. |
| 2003/0190528 A1 | 10/2003 | Saidi et al. |
| 2004/0191627 A1 | 9/2004 | Takahashi et al. |
| 2004/0262571 A1 | 12/2004 | Barker et al. |
| 2005/0031921 A1 | 2/2005 | Ovshinsky et al. |
| 2005/0181280 A1 | 8/2005 | Ceder et al. |
| 2005/0181283 A1 | 8/2005 | Pugh et al. |
| 2005/0238961 A1 | 10/2005 | Barker et al. |
| 2006/0019166 A1 | 1/2006 | Numata et al. |
| 2006/0035151 A1 | 2/2006 | Kumeuchi et al. |
| 2006/0154071 A1 | 7/2006 | Homma et al. |
| 2006/0263688 A1 | 11/2006 | Guyomard et al. |
| 2007/0072034 A1 | 3/2007 | Barker et al. |
| 2007/0223178 A1 | 9/2007 | Fujino |
| 2008/0008937 A1 | 1/2008 | Eylem et al. |
| 2008/0152993 A1 | 6/2008 | Seiler et al. |
| 2008/0158778 A1 | 7/2008 | Lipka et al. |
| 2009/0053613 A1 | 2/2009 | Inoue et al. |
| 2009/0253025 A1 | 10/2009 | Whitacre |
| 2010/0239913 A1 | 9/2010 | Kelley et al. |
| 2011/0052945 A1 | 3/2011 | Whitacre |
| 2011/0086266 A1 | 4/2011 | Kondo |
| 2011/0151311 A1* | 6/2011 | Lee .................. H01M 2/1077 429/156 |
| 2011/0274950 A1 | 11/2011 | Whitacre |
| 2011/0311846 A1 | 12/2011 | Whitacre |
| 2012/0156552 A1 | 6/2012 | Miyazaki et al. |
| 2012/0244397 A1 | 9/2012 | TenHouten et al. |

FOREIGN PATENT DOCUMENTS

| | | |
|---|---|---|
| JP | 2003-086179 A | 3/2003 |
| KR | 10-2001-0024357 A | 3/2001 |
| KR | 10-2007-0100918 A | 10/2007 |
| WO | WO0017947 A1 | 3/2000 |
| WO | WO0245200 A2 | 6/2002 |
| WO | WO 2006/111079 A1 | 10/2006 |
| WO | WO 2009/039436 A3 | 3/2009 |
| WO | 2011072295 A2 | 3/2011 |
| WO | WO 2011/027631 A1 | 3/2011 |

OTHER PUBLICATIONS

Wiley, T., et al., "Aquion Energy 2012 Progress Report—Smart Grid Demonstration Program," Department of Energy Peer Review, 19 pages, (2012).

Aquion Energy, Inc., "Sodium-Ion Batteries for Grid-Level Applications: Demonstrating Low-Cost, Grid-Scale, Ambient Temperature Sodium-Ion Batteries," American Recovery and Reinvestment Act (ARRA), 2 pages, (2012).

International Preliminary Report on Patentability received in connection with international application No. PCT/US2013/031220; mailed Sep. 25, 2014.

Akimoto et al., "Synthesis and Electrochemical Properties of $Li_{0.44}MnO_2$ as a Novel 4V Cathode Material," Electrochemical and Solid-State Letters, 2005, 8(10):A554-A557.

Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.

Alcantara et al., "$NiCo_2O_4$ Spinel: First Report on a Transition Metal Oxide for the Negative Electrode of Sodium-Ion Batteries," Chem. Mater., 2002, 14:2847-2848.

Athouel et al., "Birnessite as possible candidate for hybrid carbon/$MnO_2$ electrochemical capacitor," Abstract from $214^{th}$ ECS Meeting, Honolulu, HI, Oct. 12-17, 2008, 1 page.

Bordet-Le Geunne et al., "Structural study of two layered phases in the $Na_xMn_yO_2$ system. Electrochemical behavior of their lithium substituted derivatives," J. Mater. Chem., 2000, 10:2201-2206.

Brousse et al., "A Hybrid Activated Carbon—Manganese Dioxide Capacitor using a Mild Aqueous Electrolyte," Journal of the Electrochemical Society, 2004, 151(4):A614-A622.

(56) References Cited

OTHER PUBLICATIONS

Brousse et al., "Crystalline $MnO_2$ as Possible Alternatives to Amorphous Compounds in Electrochemical Supercapacitors," Journal of the Electrochemical Society, Oct. 6, 2006, 153 (12), A2171-A2180.
Cvjeticanin et al., "Cyclic voltammetry of $LiCr_{0.15}Mn_{1.85}O_4$ in an aqueous $LiNO_3$ solution," Journal of Power Sources, 2007, 174:1117-1120.
Doeff et al., "Orthorhombic $Na_xMnO_2$ as a Cathode Material for Secondary Sodium and Lithium Polymer Batteries," J. Electrochem. Soc., vol. 141, No. 11, Nov. 1994, L145-L147.
Doeff et al., "A High-Rate Manganese Oxide for Rechargeable Lithium Battery Applications," Journal of the Electrochemical Society, 2001, 148(3):A230-A236.
Doeff et al., "Electrochemical and structural characterization of titanium-substituted manganese oxides based on $Na_{0.44}MnO_2$," Journal of Power Sources, 2004, 125:240-248.
Doeff et al., "Lithium Insertion Processes of Orthorhombic $Na_xMnO_2$-Based Electrode Materials," J. Electrochem. Soc., Aug. 1996, 143(8):2507-2516.
Doeff et al., "Synthesis and characterization of a copper-substituted manganese oxide with the $Na_{0.44}MnO_2$ structure," Journal of Power Sources, 2002, 112:294-297.
Eftekhari et al., "Effect of Na diffusion on the formation of fibrous microcrystals of manganese oxide," Materials Research Bulletin, 2005, 40:2205-2211.
Ellis et al., "A Multifunctional 3.5V Iron-based Phosphate Cathode for Rechargeable Batteries," Nature Materials, vol. 6, Oct. 2007.
Feng et al., "Hydrothermal Soft Chemical Synthesis of Tunnel Manganese Oxides with $Na^+$ as Template," Chemistry Letters, 2000:284-285.
Huang et al., "Kinetics of Electrode Processes of $LiFePO_4$ in Saturated Lithium Nitrate Solution," Acta Phys.—Chim. Sin., 2007, 23(1):129-133.
Jin et al., "Hybrid supercapacitor based on MnO2 and columned FeOOH using $Li_2SO_4$ electrolyte solution," Journal of Power Sources, 2008, 175:686-691.
Imanishi et al., "Study on Electrochemical Sodium Deintercalation of $\alpha$-$Na_xFeO_2$," Denki Kagaku, 1993, 61 (12), 1451-1452.
Kanoh et al., "Electrochemical Intrecalation of Alkali-Metal Ions into Birnessite-Type Manganese Oxide in Aqueous Solution," Langmuir, 1997, 13:6845-6849.
Kanoh et al., "Equilibrium Potentials of Spinel-Type Manganese Oxide in Aqueous Solutions," J. Electrochem. Soc., Nov. 1993, 140(11):3162-3166.
Kim et al., "Electrochemical properties of sodium/pyrite battery at room temperature," Journal of Power Sources, 2007, 174:1275-1278.
Kim et al., "Ionic conductivity of sodium ion with $NaCF_3SO_3$ salts in electrolyte for sodium batteries," Materials Science Forum, 2005, 486-487:638-641.
Komaba et al., "Enhanced Supercapacitive Behaviors of Birnessite Type Manganese Dioxide," Abstract from $214^{th}$ ECS Meeting, Honolulu, HI, Oct. 12-17, 2008, 1 page.
Li et al., "A study of nitroxide polyradical/activated carbon composite as the positive electrode material for electrochemical hybrid capacitor," Electrochimica Acta, 2007, 52:2153-2157.
Li et al., "Rechargeable Lithium Batteries with Aqueous Electrolytes," Science, vol. 264, May 20, 1994.
Ma et al., "A novel concept of hybrid capacitor based on manganese oxide materials," Electrochemistry Communications, 2007, 9:2807-2811.
Mi et al., "Electrochemical behaviors of solid $LiFePO_4$ and $Li_{0.99}Nb_{0.01}FePO_4$ in $Li_2SO_4$ aqueous electrolyte," Journal of Electroanalytical Chemistry, 2007, 602:245-254.
Park et al., "A Study of Copper as a Cathode Material for an Ambient Temperature Sodium Ion Batter," Journal of the Electrochemical Society, 2001, 148(12):A1346-A1351.
Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.
Renuka et al., "An Investigation of Layered Birnessite Type Manganese Oxides for Battery Applications," Journal of Power Sources, 87 (2000), 144-152.
Rydh et al., "Energy analysis of batteries in photovoltaic systems. Part I: Performance and energy requirements," Energy Conversion and Management, 2005, 46:1957-1979.
Rydh et al., "Energy analysis of batteries in photovoltaic systems. Part II: Performance and energy requirements," Energy Conversion and Management, 2005, 46:1980-2000.
Sauvage et al., "Study of the Insertion/Deinsertion Mechanism of Sodium into $Na_{0.44}MnO_2$," Inorganic Chemistry, 2007, 46, (8), 3289-3294.
Sauvage et al., "Study of the potentiometric response towards sodium ions of $Na_{0.44-x}MnO_2$ for the development of selective sodium ion sensors," Sensors and Actuators B—Chemical, 2007, 120, (2), 638-644.
Spahr et al., "Electrochemical insertion of lithium, sodium, and magnesium in molybdenum(VI) oxide," Journal of Power Sources, 1995, 54:346-351.
Su et al., "Symmetric Self-Hybrid Supercapacitor Consisting of Multiwall Carbon Nanotubes and Co—Al Layered Double Hydroxides," Journal of the Electrochemical Society, 2008, 155(2):A110-A114.
Tani et al,. "Alkali Metal Ion-Selective Electrodes Based on Relevant Alkali Metal Ion Doped Manganese Oxides," Mikrochim. Acta 1998, 129:81-90.
Tarascon et al., "Chemical and Electrochemical Insertion of Na into the Spinel $\lambda$-$MNO_2$ Phase," Solid State Ionics, 57 (1992), 113-120.
Tevar et al., Cycling-Induced Crystallographic and Morphological Changes in Na4Mn9O18, 214th ECS Meeting, Abstract #642, Honolulu, HI, Oct. 12-17, 2008.
Toupin et al., "Charge Storage Mechanism of $MnO_2$ Electrode Used in Aqueous Electrochemical Capacitor," Chem. Mater., Jul. 16, 2004, 16, 3184-3190.
Wang et al., "A new concept hybrid electrochemical supercapacitor: Carbon/$LiMn_2O_4$ aqueous system," Electrochemistry Communications, 2005, 7:1138-1142.
Wang et al., "Hybrid Aqueous Energy Storage Cells Using Activated Carbon and Lithium-Intercalated Compounds," Journal of the Electrochemical Society, Jan. 2006, 153 (2), A450-A454.
Wang et al., "Improvement of cycle performance of lithium ion cell $LiMn_2O_4$/$Li_xV_2O_5$ with aqueous solution electrolyte by polypyrrole coating an anode," Electrochimica Acta, 2007, 52:5102-5107.
Whitacre et al., "Na4Mn9O18 as a Positive Electrode Material for an Aqueous Electrolyte Sodium-Ion Energy Storage Device," Electrochemistry Communications, 2010, vol. 12, 463-466.
Yang et al., "Interfacial synthesis of porous $MnO_2$ and its application in electrochemical capacitor," Electrochimica Acta, 2007, 53:752-757.
Zhuo et al., "The preparation of $NaV_{1-x}Cr_xPO_4F$ cathode materials or sodium-ion battery," Journal of Power Sources, 2006, 160:698-703.
International Preliminary Report on Patentability, WIPO, Application No. PCT/US2009/039436, Oct. 21, 2010.
Wessells et al., "Copper Hexacyanoferrate Battery Electrodes with Long Cycle Life and Higher Power," Nature Communications, DOI: 10/1038/ncomms1563, © 2011 Macmillan Publishers Limited.
Luo et al., "Raising the Cycling Stability of Aqueous Lithium-ion Batteries by Eliminating Oxygen in the Electrolyte," Nature Chemistry, vol. 2, Sep. 2010.
Jayalakshmi et al., "Charge-Discharge Characteristics of a Solid-State Prussian Blue Secondary Cell," Journal of Power Sources, 87 (2000), pp. 212-217.
Plichta et al., "Lithium Ion Aqueous Cells," Army Research Laboratory, Feb. 1995.
Candelaria et al., "Nanostructured Carbon for Energy Storage and Conversion," Nano Energy (2012) 1, 195-220.
Liu et al., "Hydrogen Storage Alloys as the Anode Materials of the Direct Borohydride Fuel Cell," Journal of Alloys and Compounds, 454 (2008), pp. 280-285.

(56) References Cited

OTHER PUBLICATIONS

Zhu et al., "Possible Use of Ferrocyanide as a Redox Additive for Prevention of Electrolyte Decomposition in Overcharged Nickel Batteries," Electrochimica Acta 48 (2003), 4033-4037.
Lu et al., "Prussian Blue: A New Framework of Electrode Materials for Sodium Batteries," Chem. Commum., 2012, 48, 6544-6546.
Li et al., "Hydrogen Storage Alloy and Carbon Nanotubes Mixed Catalyst in a Direct Borohydride Fuel Cell," J. Mater. Sci. Technol., 2011, 27 (12), 1089-1093.
Bakhmatyuk et al., "Intercalation Pseudo-Capacitance in Carbon System of Energy Storage," Rev. Adv. Mater. Sci. 14 (2007), 151-156.
Zhang et al., "Redox Shuttle Additives for Lithium-Ion Battery," www.intechooen.com (2012) pp. 173-189.
Begam et al., "NASICON Open Framework Structured Transition Metal Oxides for Lithium Batteries," www.intechopen.com (2010) pp. 93-121.
Redey L., "Chemical Overcharge and Overdischarge Protection for Li-alloy/Transition-Metal Sulfide Cells," Abstract, Journal of the Electrochemical Society, vol. 136:7, Jul. 1989.
Redey L., "Overcharge Protection in Li-alloy/Metal Disulfide Cells," Abstract, Meeting of the Electrochemical Society, Honolulu, HI, Oct. 1987.
Qian et al., "NaxMyFe(Cn)6(M=Fe, Co, Ni): A New Class of Cathode Materials for Sodium Ion Batteries," Abstract, Journal of Electrochemistry, 2012, V18(2).
Pasta et al., "A High-Rate and Long Cycle Life Aqueous Electrolyte Battery for Grid-Scale Energy Storage," Abstract, Nature Communications, Oct. 3, 2012.
Fic et al., "Unusual Energy Enhancement in Carbon-Based Electrochemical Capacitors," Abstract, J. Mater. Chem. 22 (2012).
International Search Report, International Application No. PCT/US2013/031220, issued Jun. 25, 2014, 61pgs.

\* cited by examiner

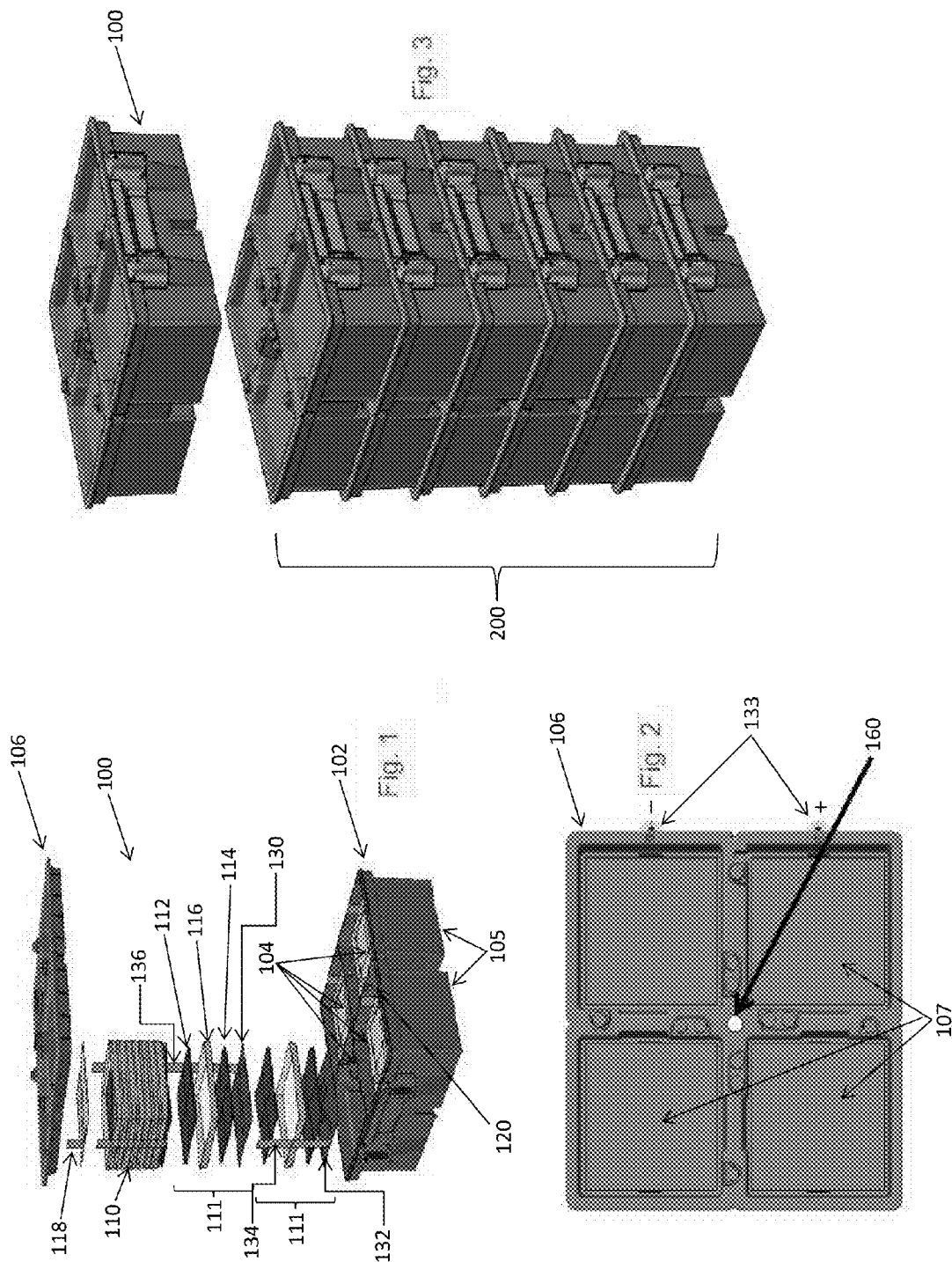

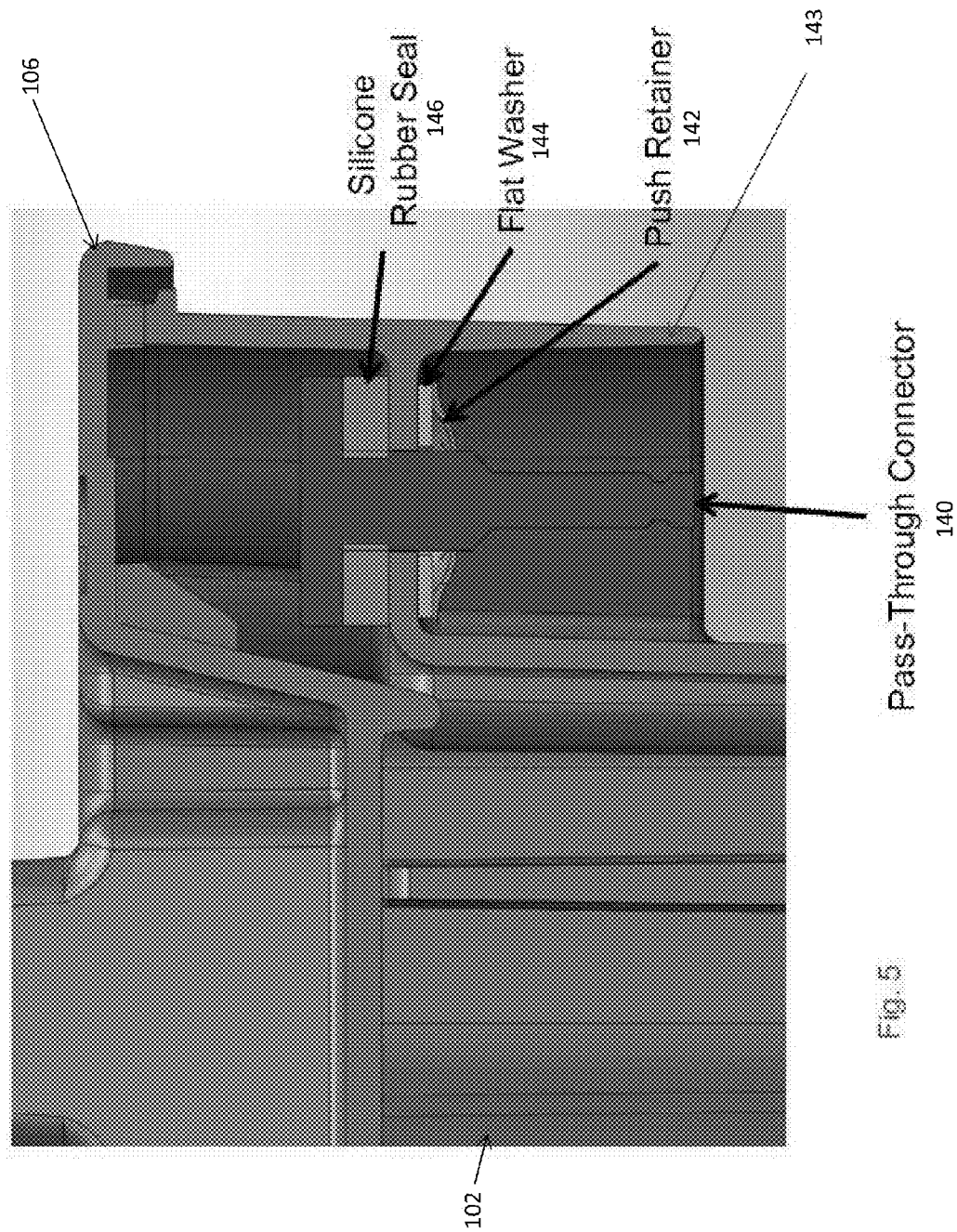

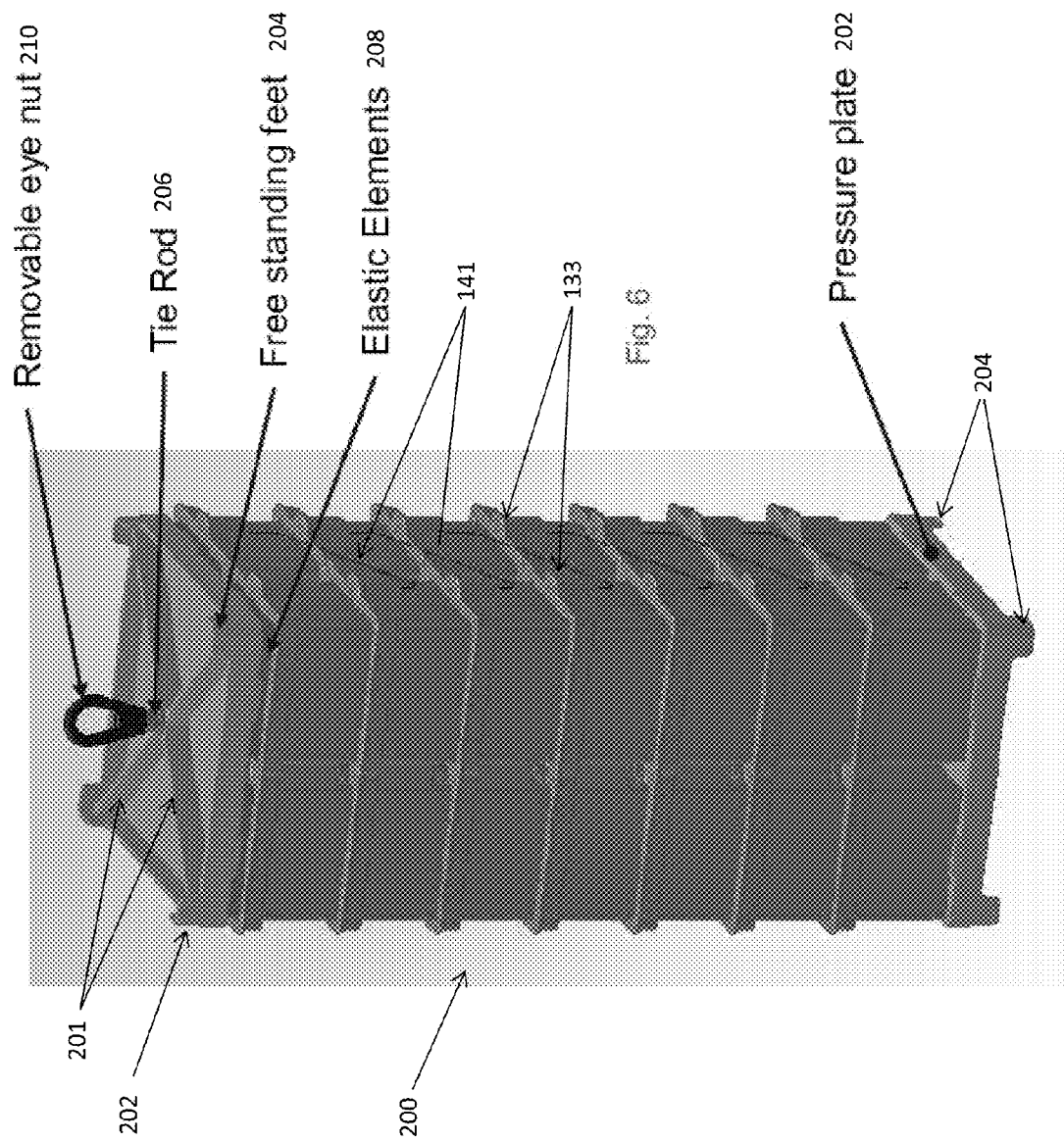

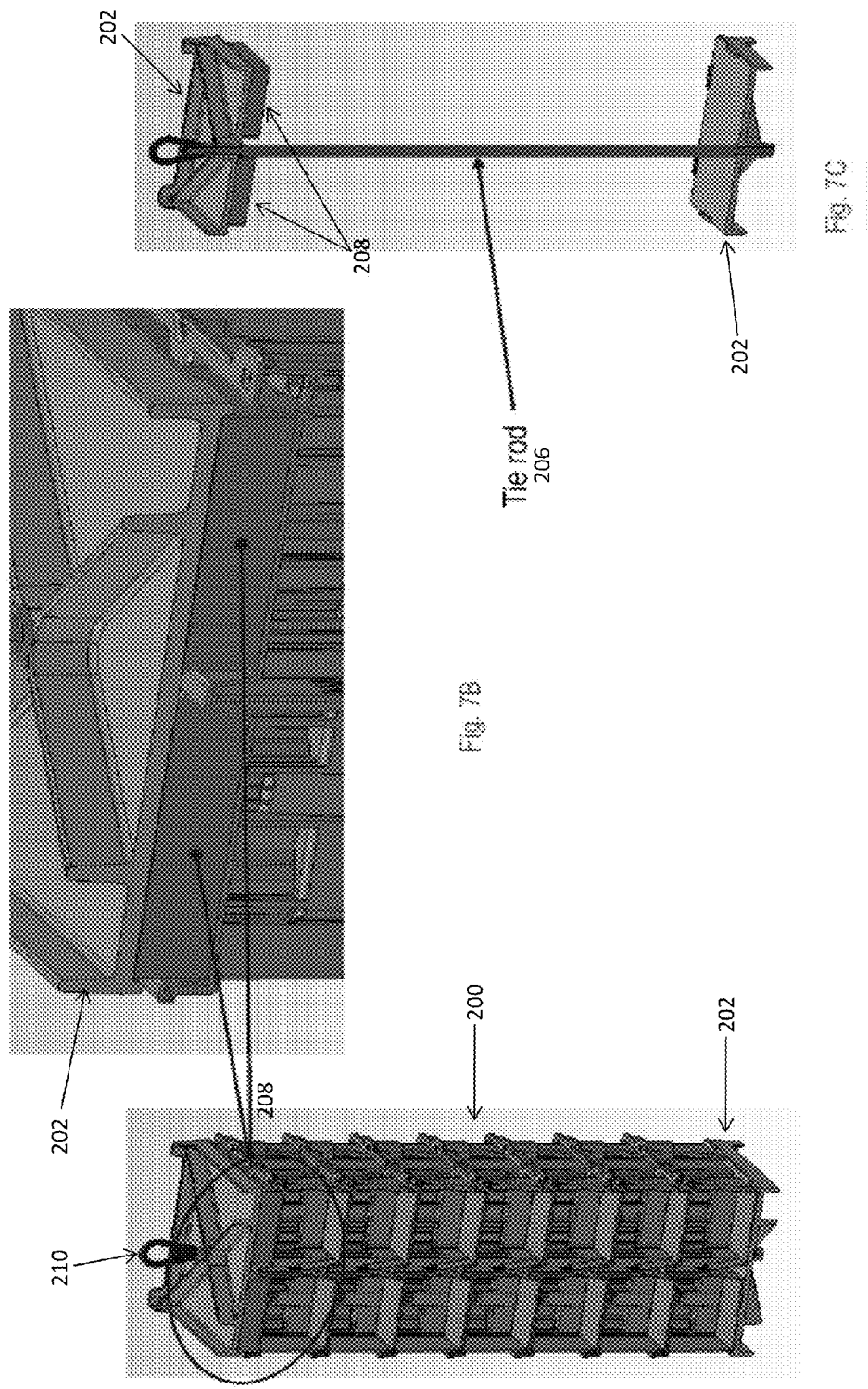

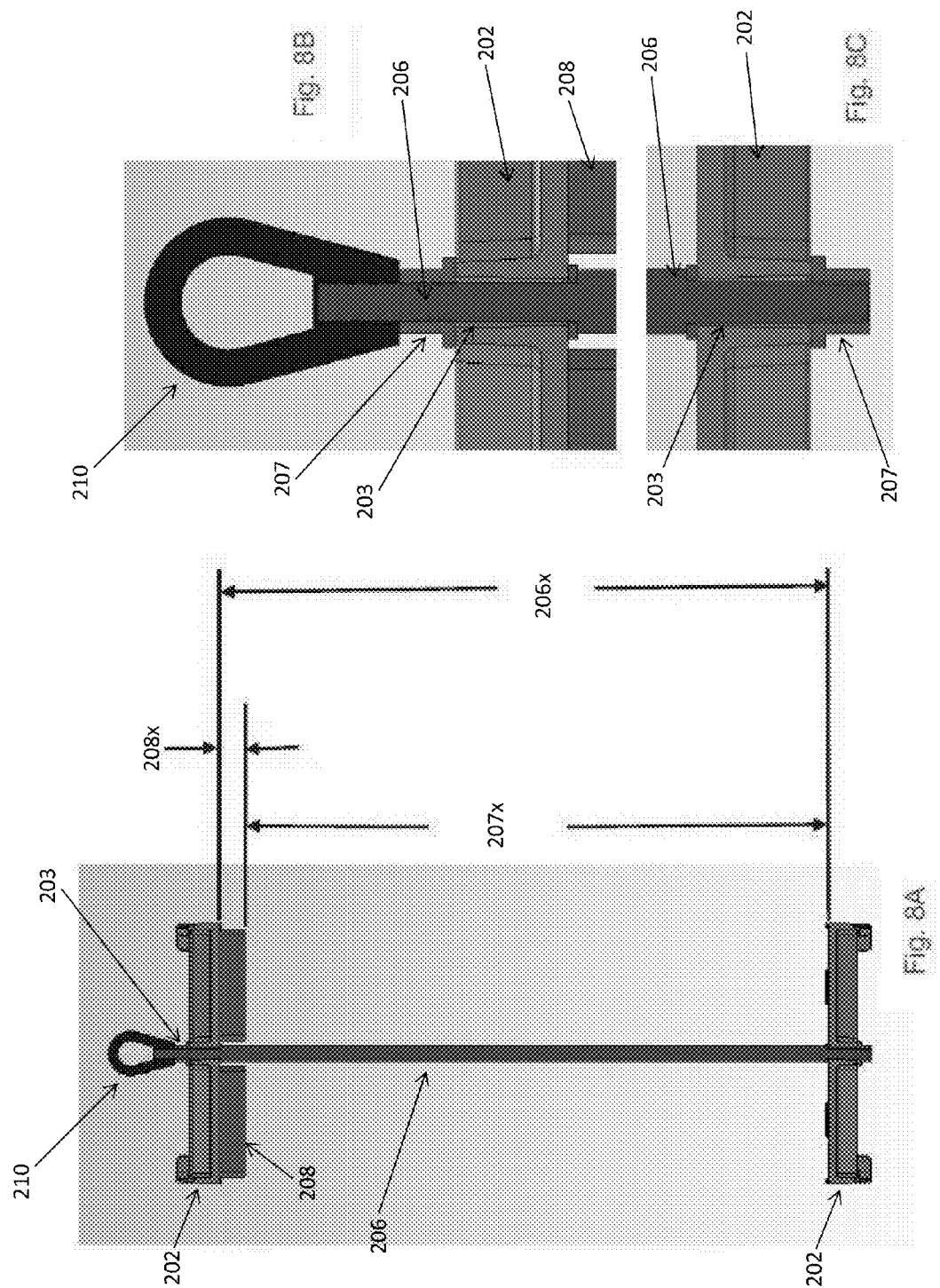

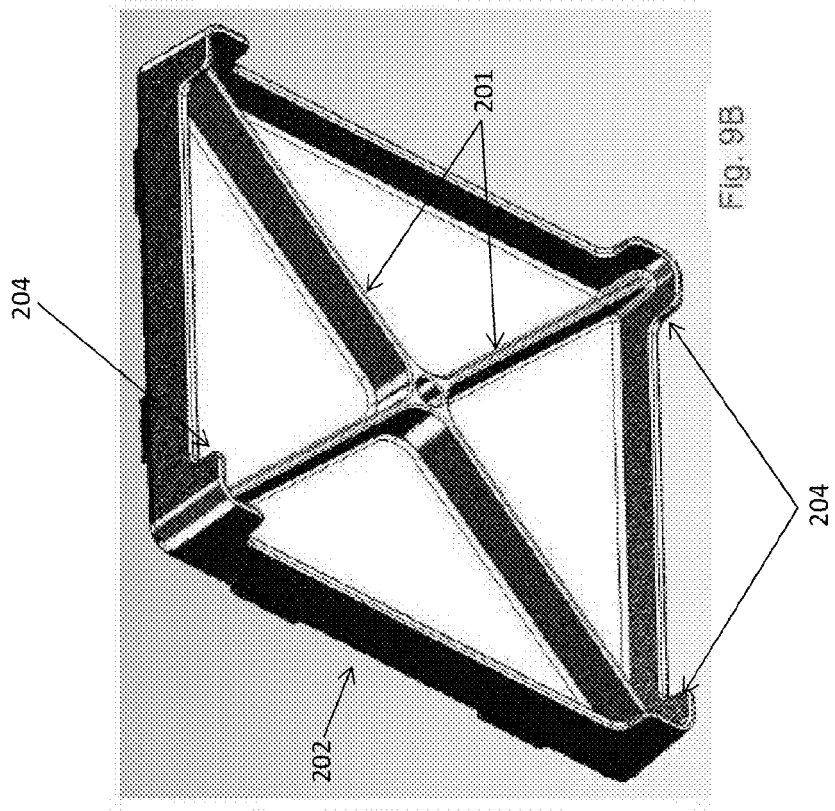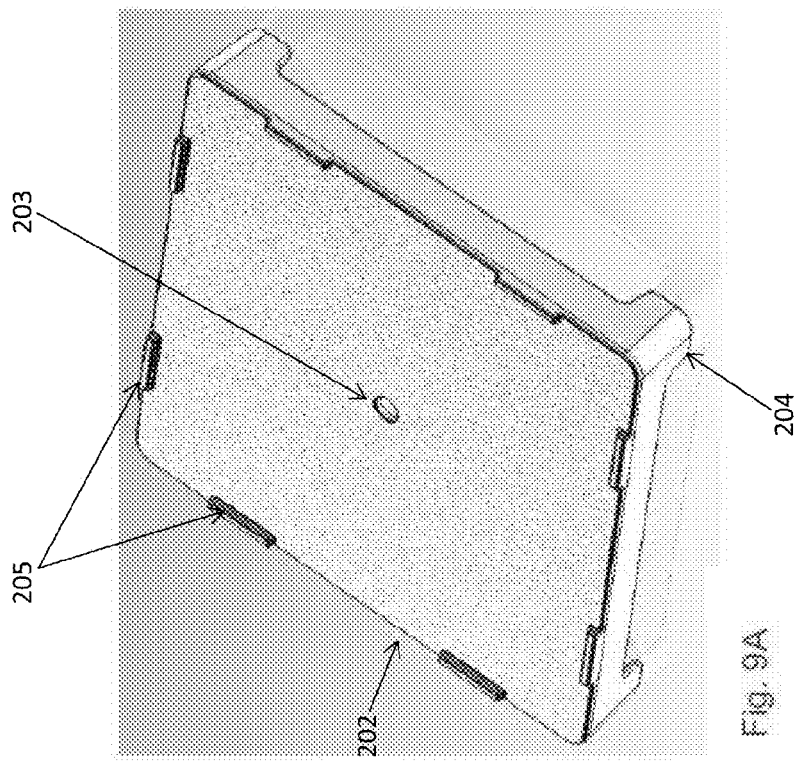

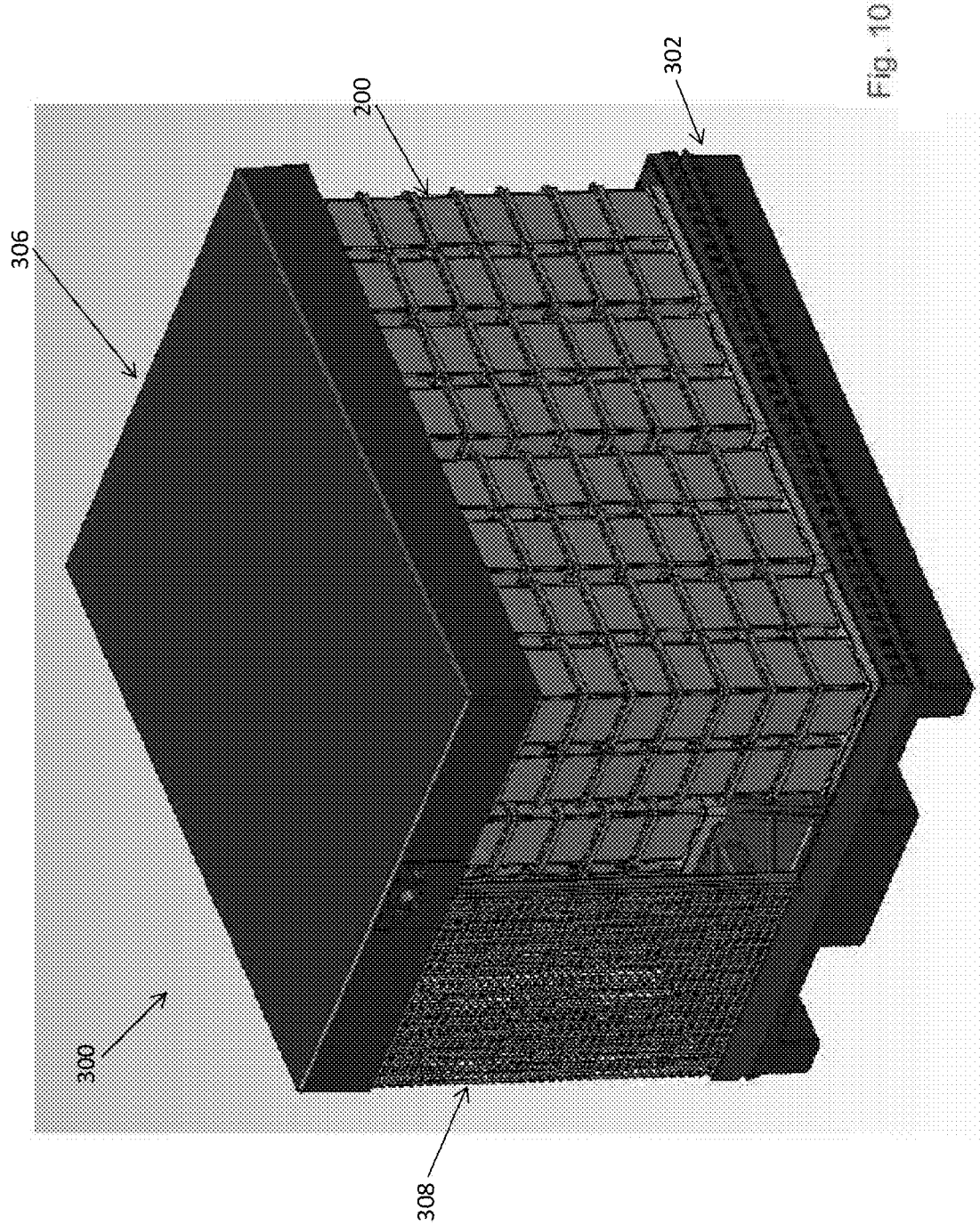

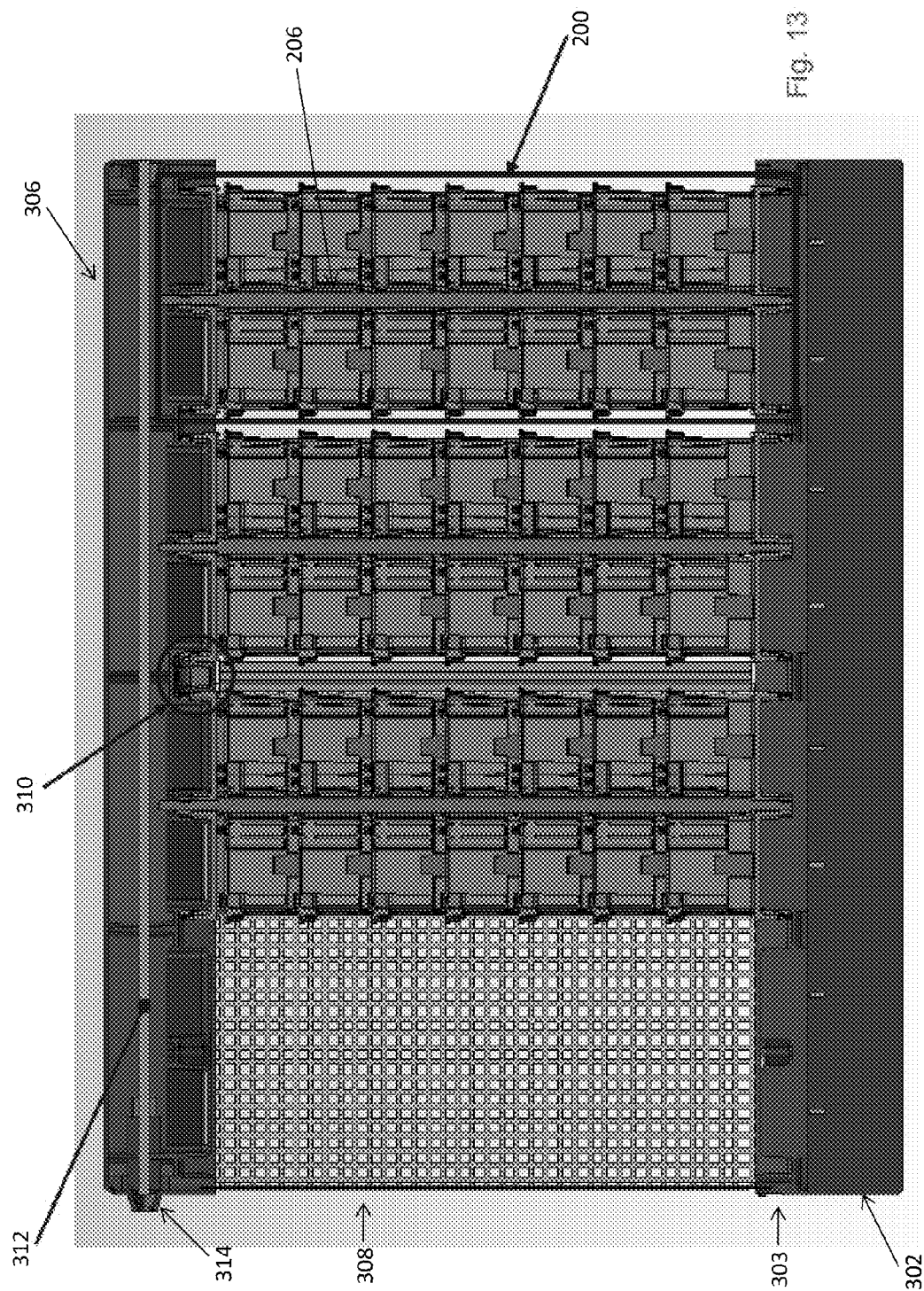

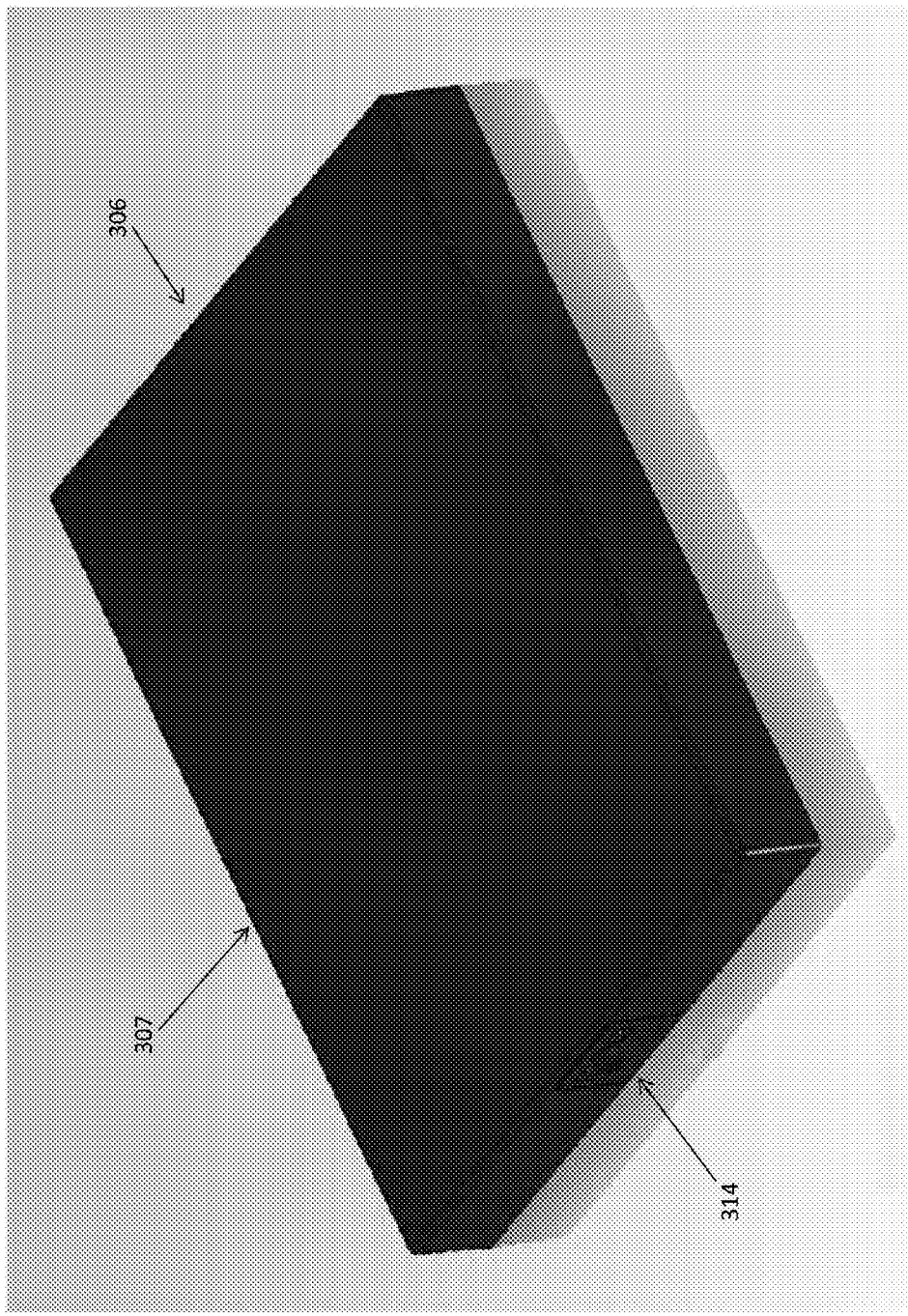

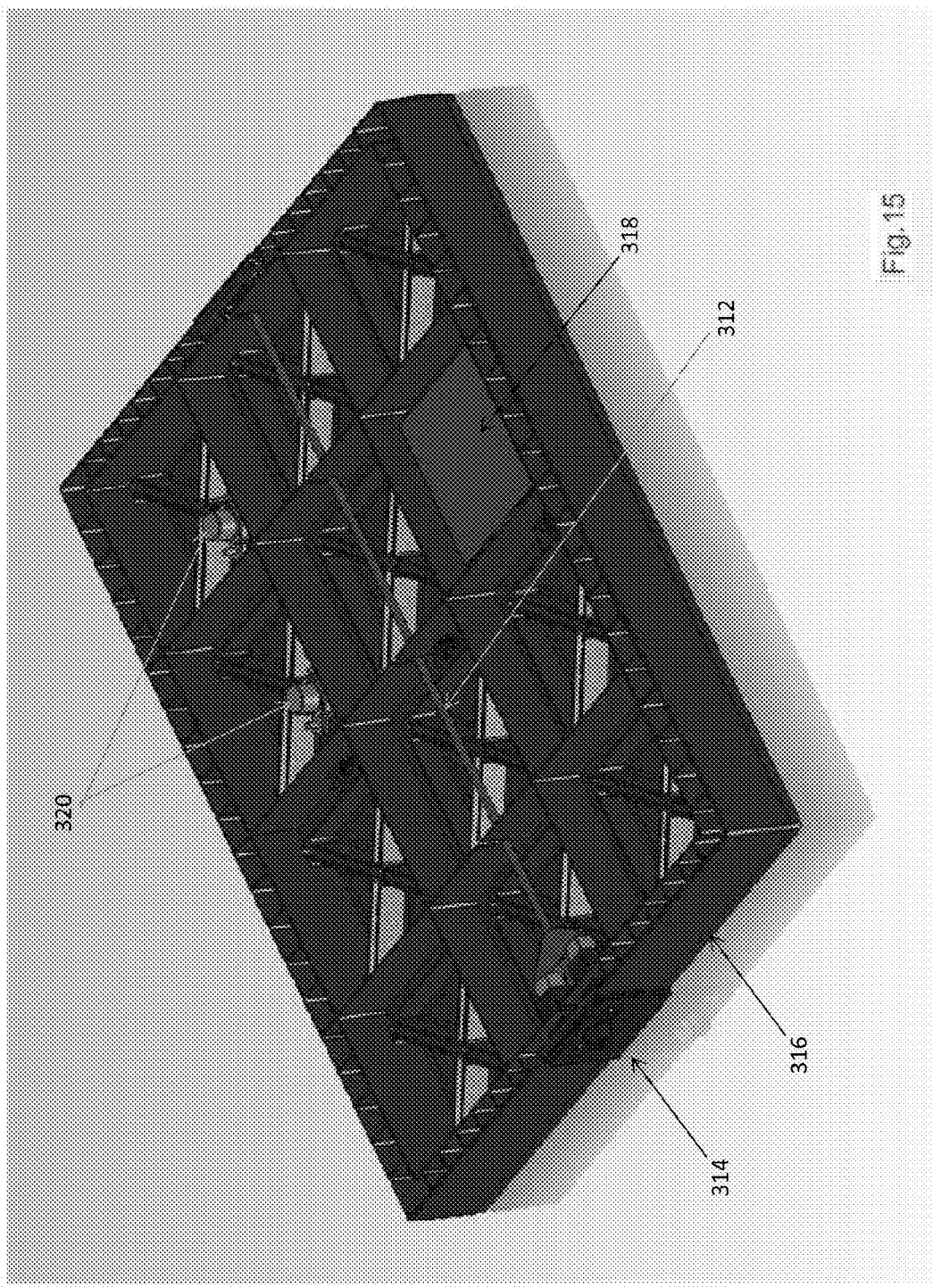

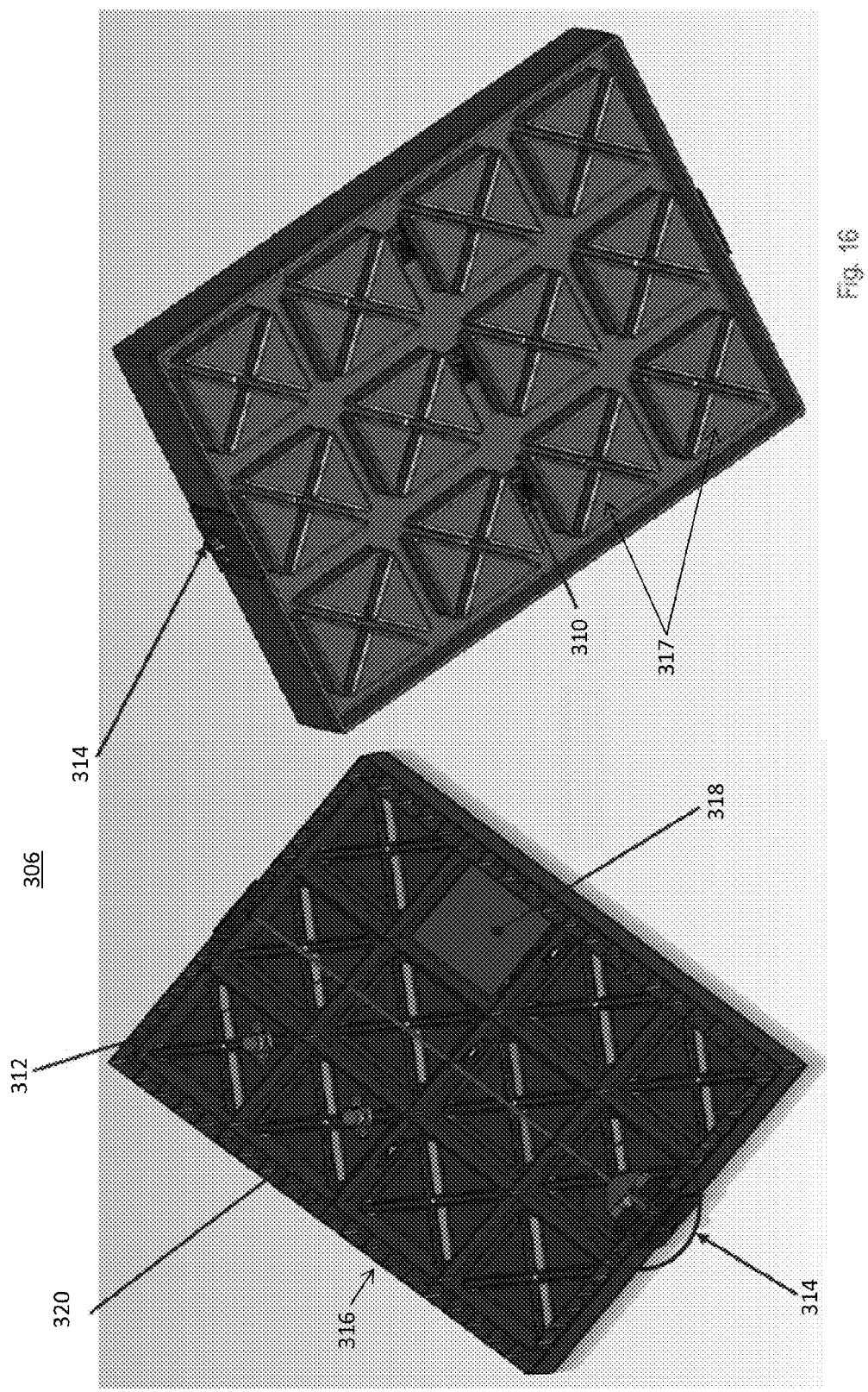

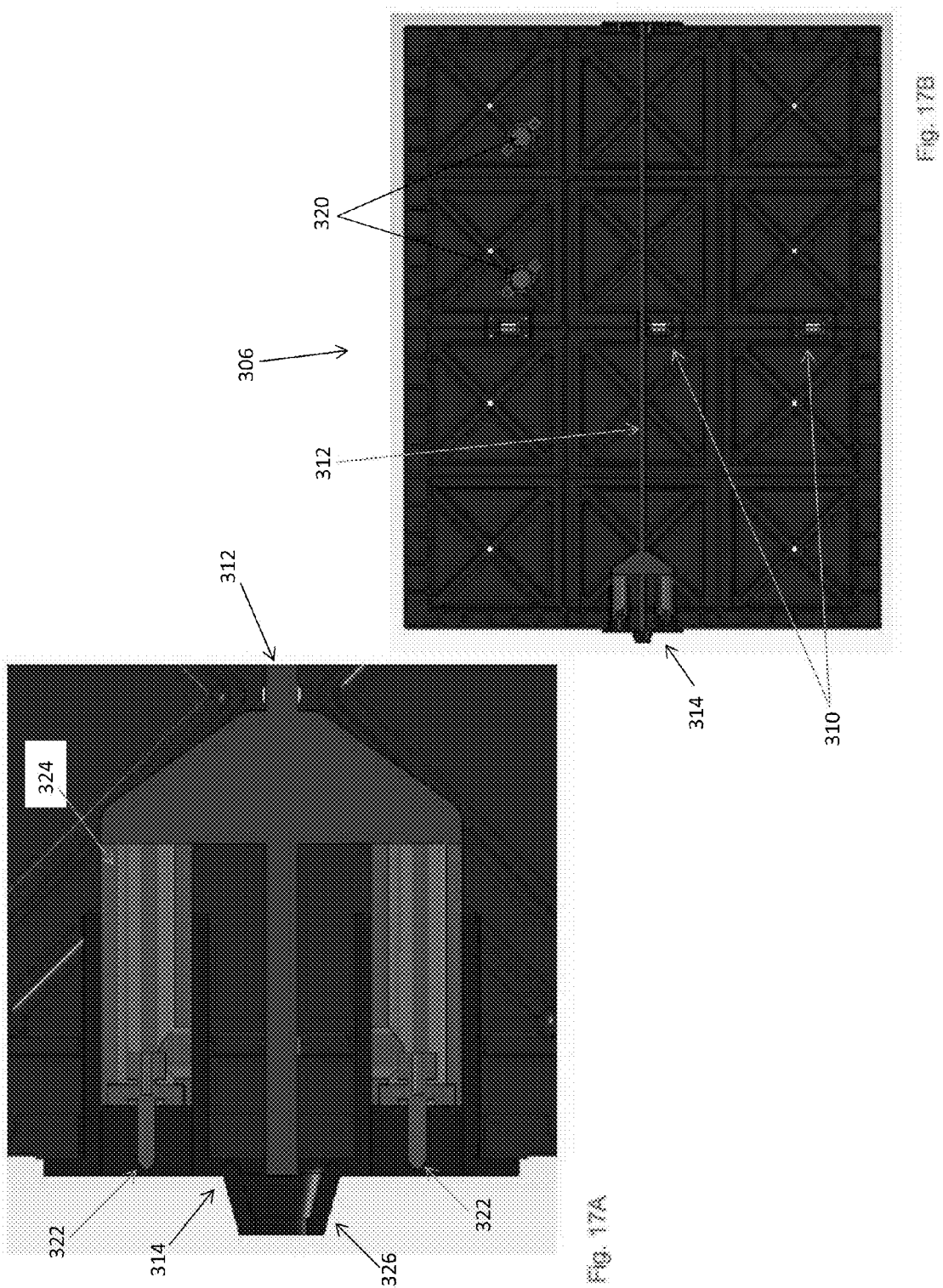

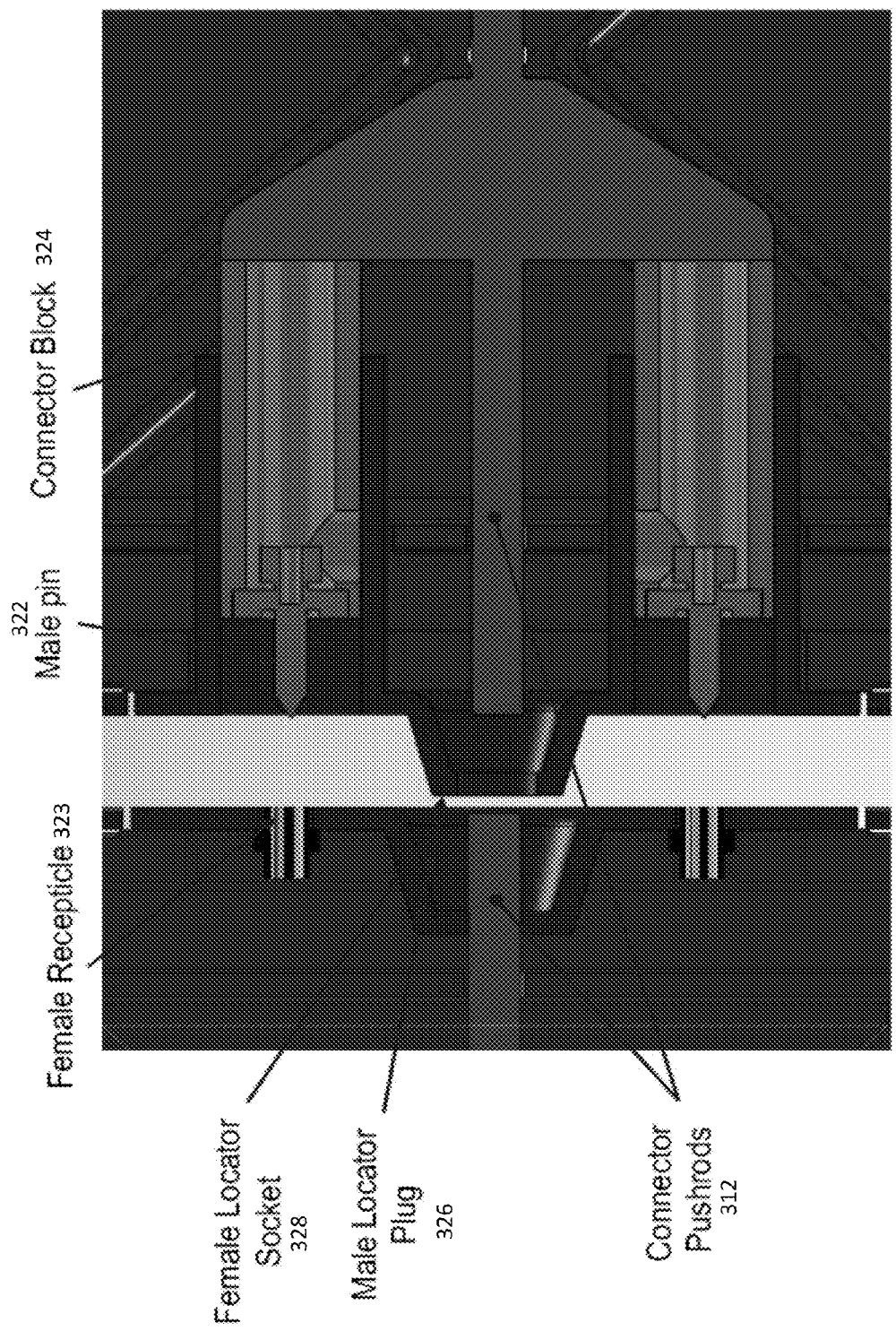

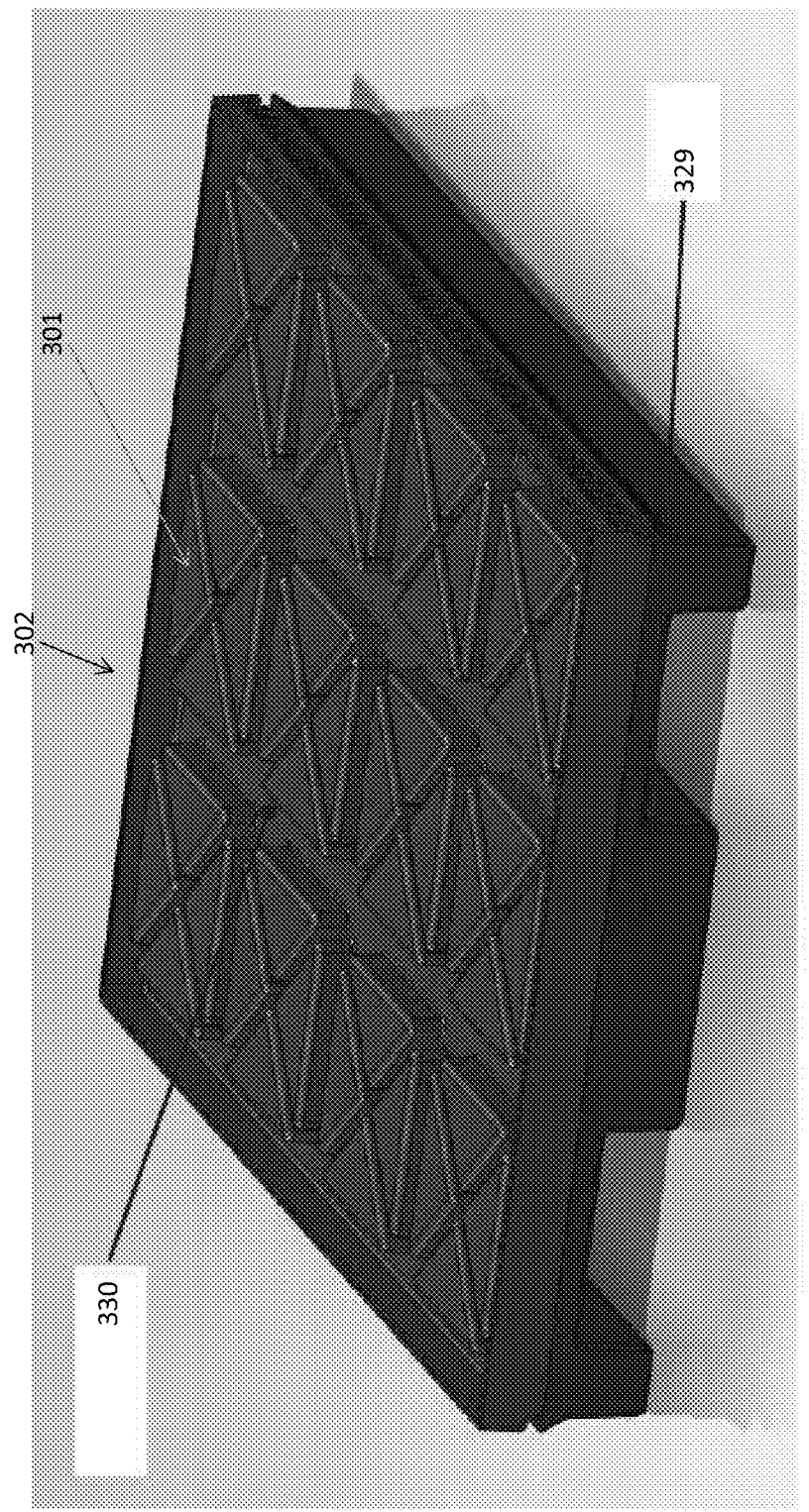

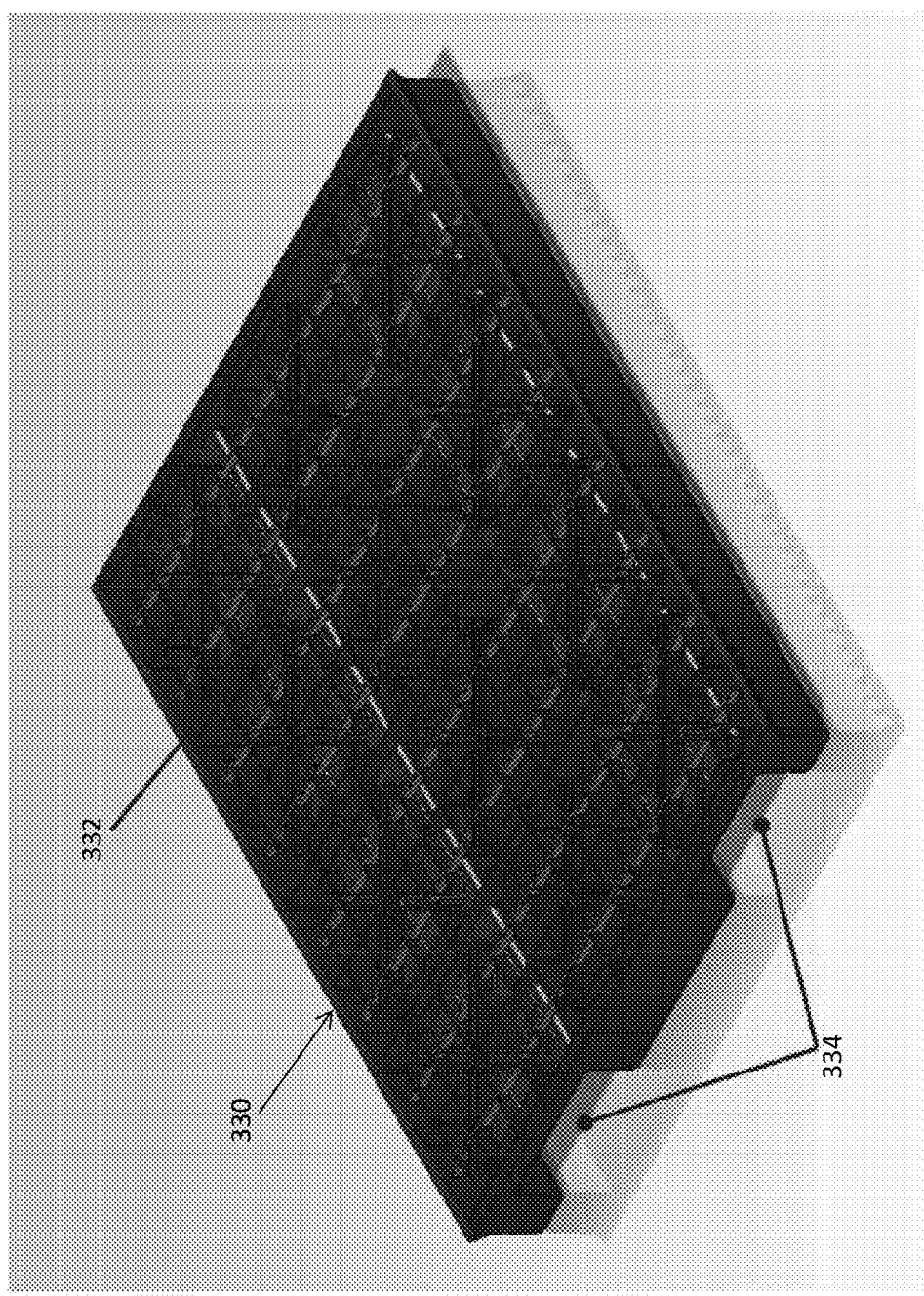

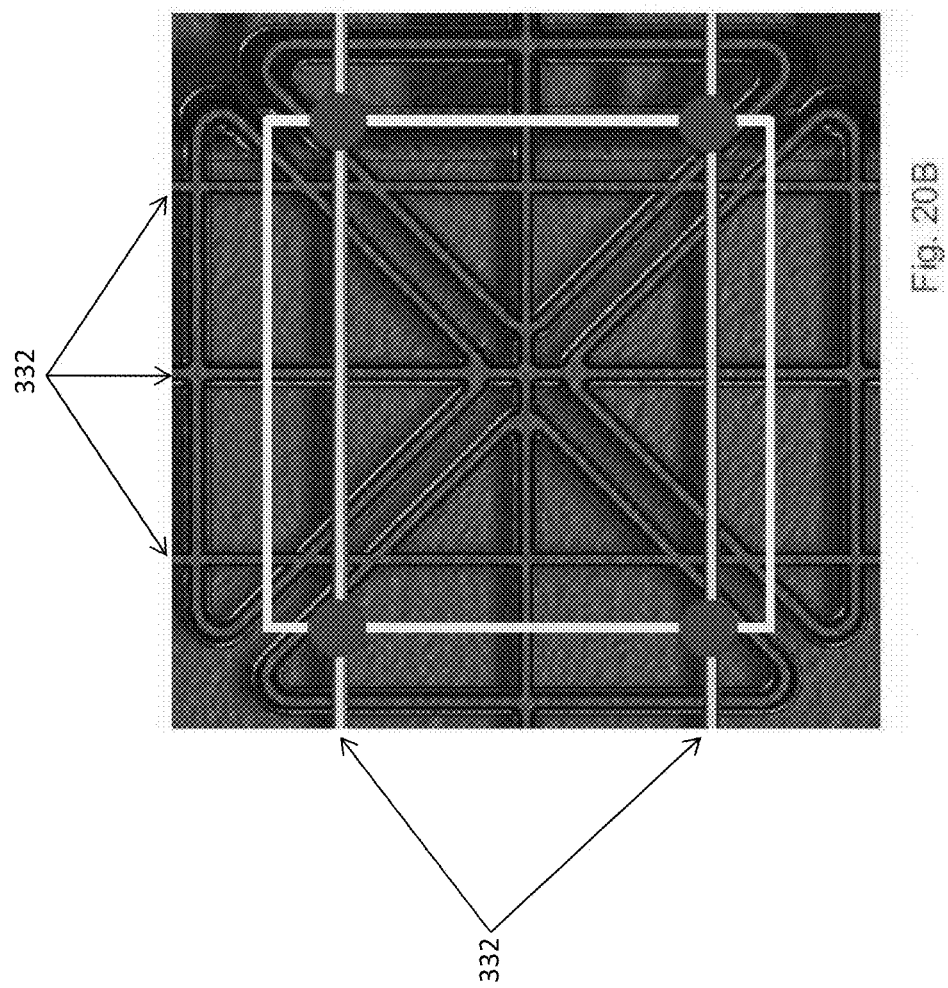

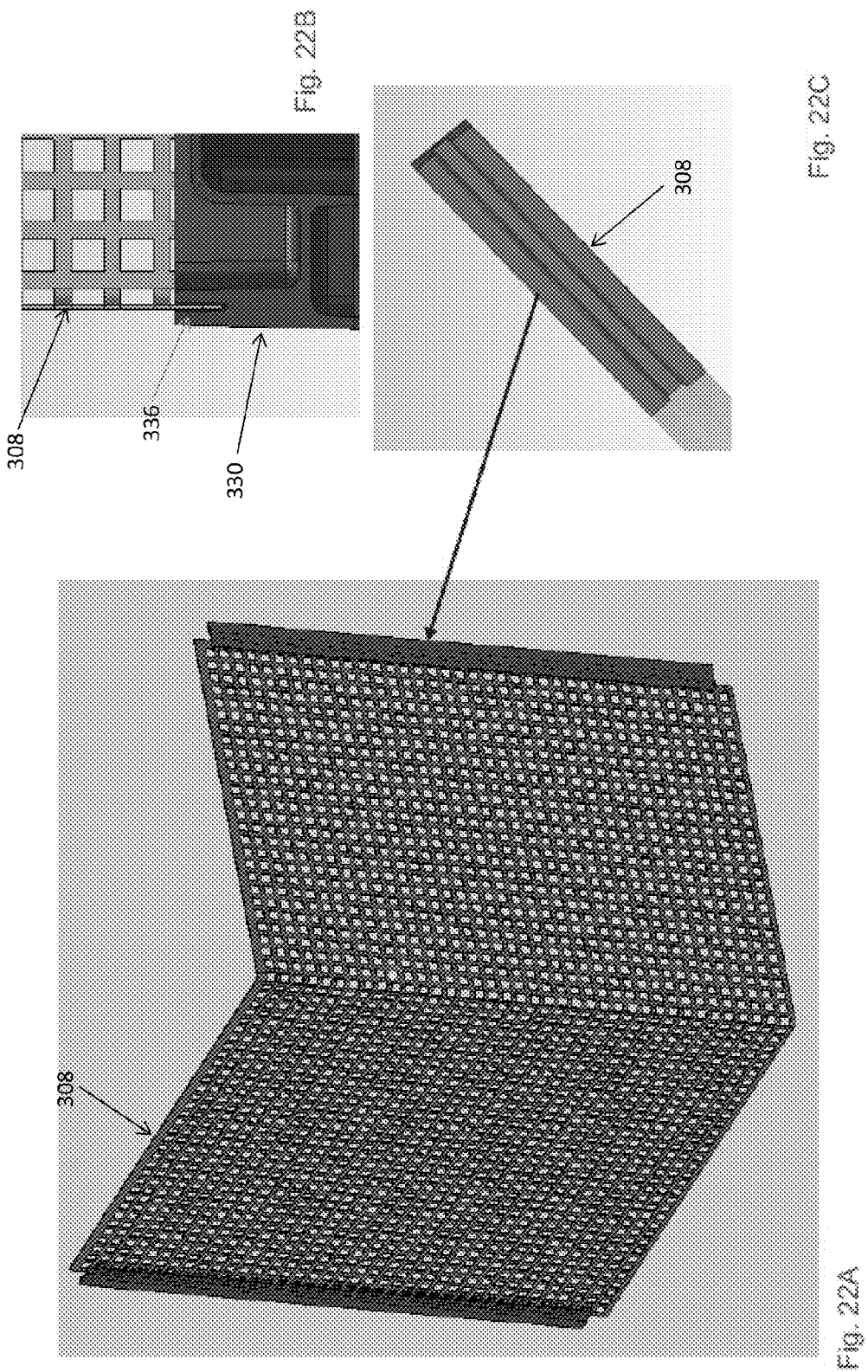

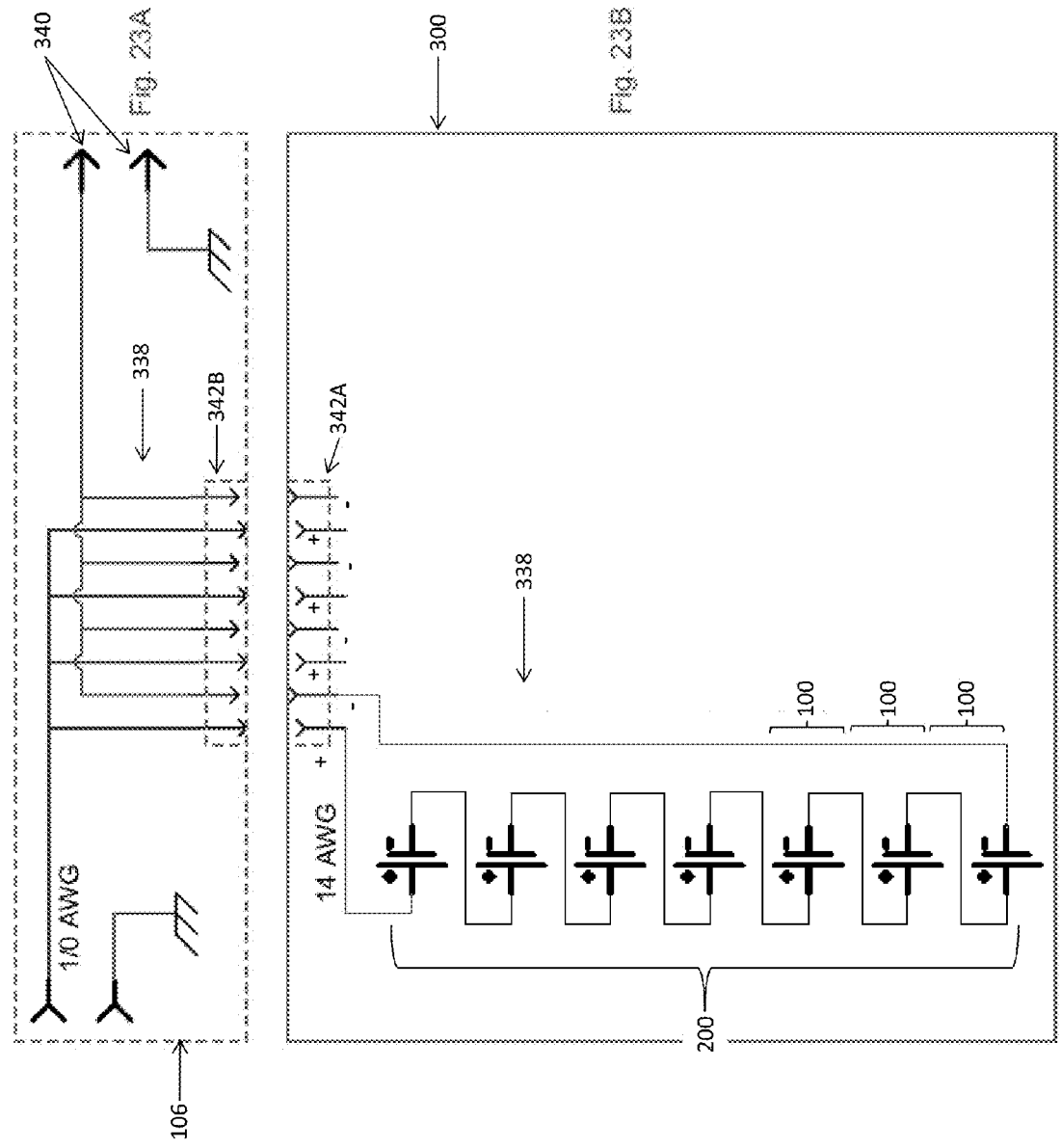

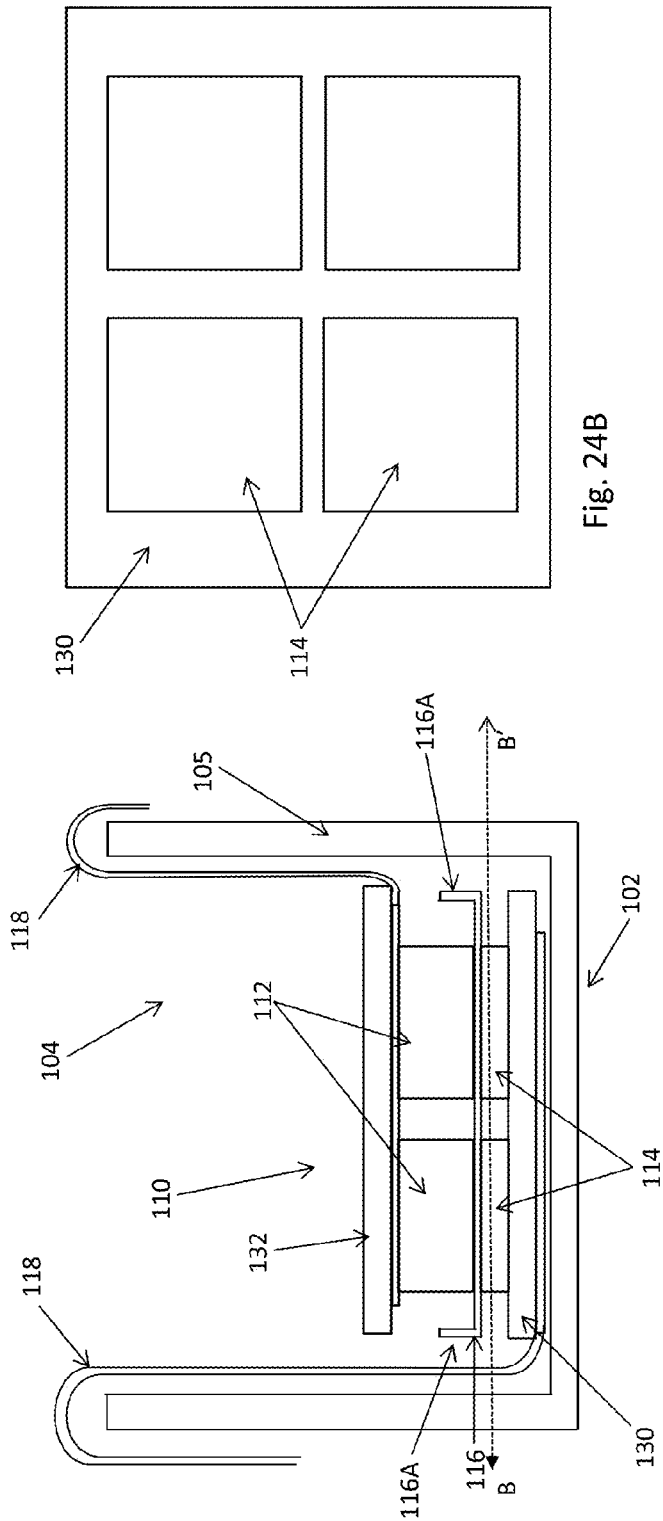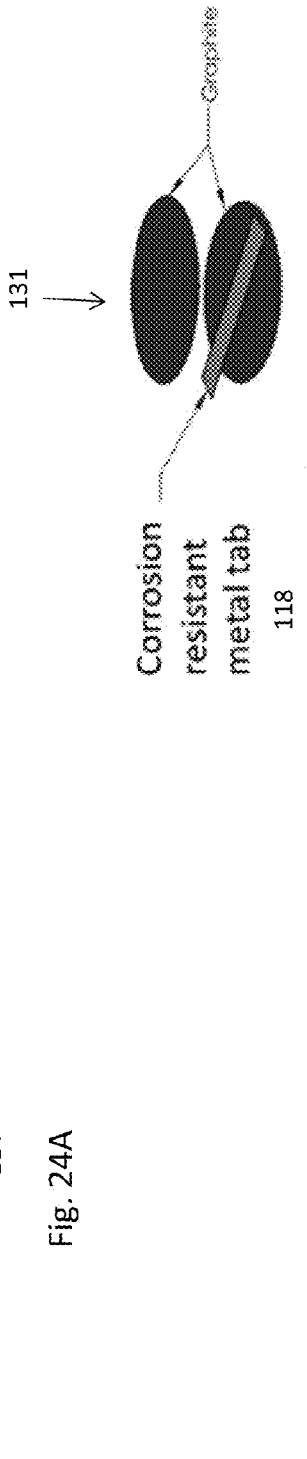

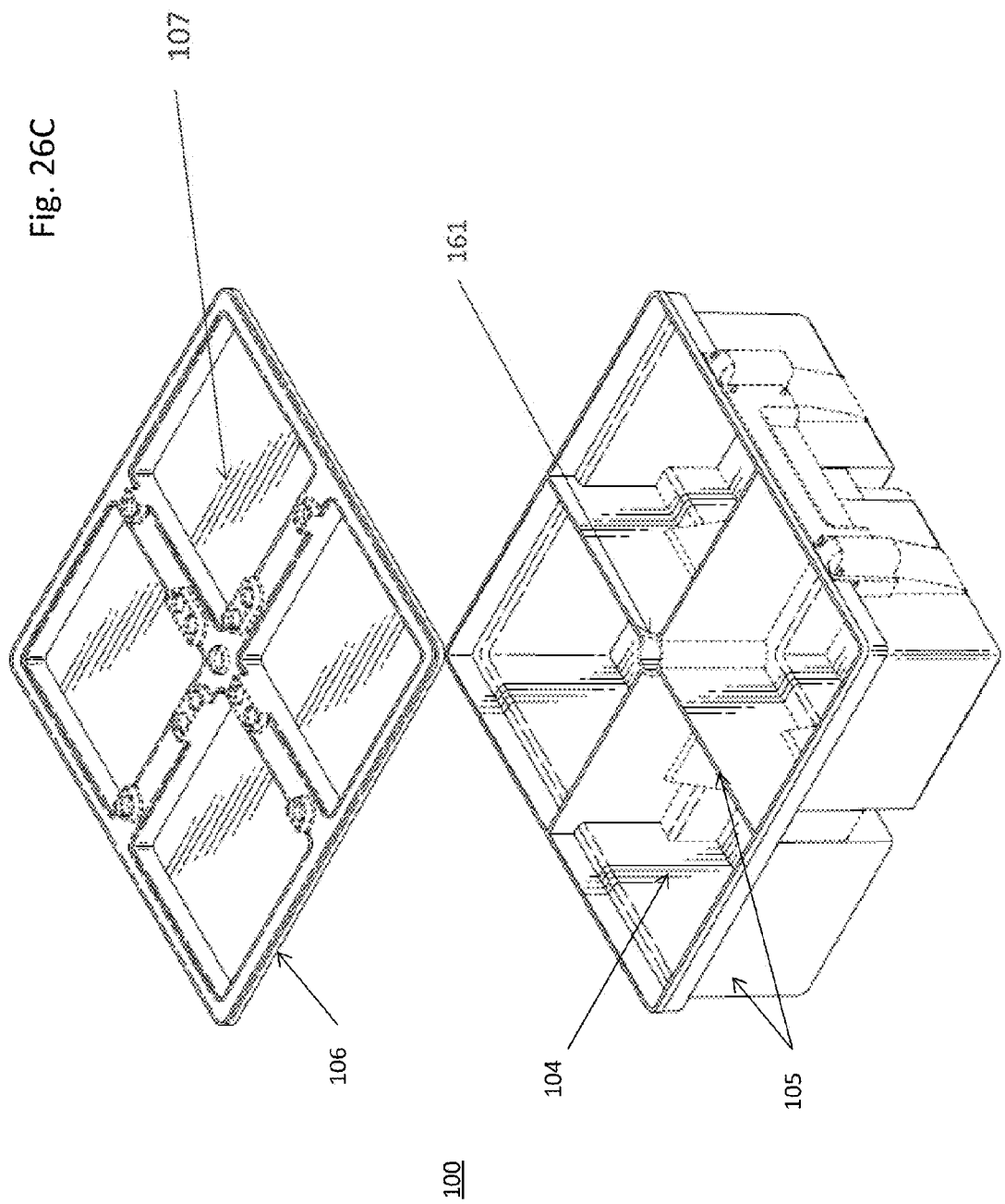

LARGE FORMAT ELECTROCHEMICAL ENERGY STORAGE DEVICE HOUSING AND MODULE

FIELD

The present invention is directed to aqueous batteries and hybrid energy storage devices, and in particular to housings for such devices.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Batteries for these stationary applications typically store between 1 and 50 kWh of energy (depending on the application) and have historically been based on the lead-acid (Pb acid) chemistry. Banks of deep-cycle lead-acid cells are assembled at points of distributed power generation and are known to last 1 to 10 years depending on the typical duty cycle. While these cells function well enough to support this application, there are a number of problems associated with their use, including: heavy use of environmentally unclean lead and acids (it is estimated that the Pb-acid technology is responsible for the release of over 100,000 tons of Pb into the environment each year in the US alone), significant degradation of performance if held at intermediate state of charge or routinely cycled to deep levels of discharge, a need for routine servicing to maintain performance, and the implementation of a requisite recycling program. There is a strong desire to replace the Pb-acid chemistry as used by the automotive industry. Unfortunately the economics of alternative battery chemistries has made this a very unappealing option to date.

Despite all of the recent advances in battery technologies, there are still no low-cost, clean alternates to the Pb-acid chemistry. This is due in large part to the fact that Pb-acid batteries are remarkably inexpensive compared to other chemistries ($200/kWh), and there is currently a focus on developing higher-energy systems for transportation applications (which are inherently significantly more expensive than Pb-acid batteries).

SUMMARY

An embodiment relates to an assembly including a plurality of non-load bearing housings, each housing including a plurality of cavities. Each cavity includes a stack of freely stacked electrochemical storage cells in the housings. Each electrochemical storage cell includes an anode electrode, a cathode electrode and a separator located between the anode electrode and the cathode electrode. The assembly is configured such that pressure applied to the assembly is born by the freely stacked electrochemical storage cells.

Another embodiment relates to a method of making an assembly including a plurality of non-load bearing housings. Each housing includes a plurality of cavities. The method includes freely stacking anode electrodes, cathode electrodes and separators between the anode electrodes and the cathode electrodes in the plurality of cavities. The assembly is configured such that pressure applied to the assembly is born by the freely stacked electrochemical storage cells.

BRIEF DESCRIPTION OF THE DRAWINGS

FIG. 1 is an exploded view of an electrochemical device according to an embodiment.

FIG. 2 is a plan view of a housing lid of an electrochemical device according to an embodiment.

FIG. 3 is a perspective view of a stack of electrochemical devices according to an embodiment.

FIG. 5 is schematic illustration showing details of a portion of electrochemical device according to an embodiment.

FIG. 6 is a perspective view of a stack of electrochemical devices according to an embodiment.

FIG. 7A is a perspective view showing details of the embodiment illustrated in FIG. 6.

FIG. 7B is a perspective view showing details of the embodiment illustrated in FIG. 6.

FIG. 7C is a cross section showing details of the embodiment illustrated in FIG. 6.

FIG. 8A is a schematic illustration showing additional details of the embodiment illustrated in FIG. 6.

FIG. 8B is a close-up of a portion of FIG. 8A.

FIG. 8C is a close-up of another portion of FIG. 8A.

FIG. 9A is a perspective view of a top portion of an element of an assembly of a stack of electrochemical devices according to an embodiment.

FIG. 9B is a perspective view of a bottom portion of an element of an assembly of a stack of electrochemical devices according to an embodiment.

FIG. 10 is a perspective view of a module of devices according to an embodiment.

FIG. 13 is a schematic illustration of a module according to an embodiment.

FIG. 14 is a perspective view of a lid assembly according to an embodiment.

FIG. 15 is a perspective view of the lid assembly of FIG. 14 with the cover removed.

FIG. 16 is a perspective view illustrating details of the top and bottom of a portion of the lid assembly of FIG. 14.

FIG. 17A is a magnified view of a cross section through a connector pushrod of the lid assembly of FIG. 14.

FIG. 17B is a cross section through a connector pushrod of the lid assembly of FIG. 14.

FIG. 18 is a cross section illustrating a plug connector for module to module connection according to an embodiment.

FIG. 19 is a perspective view of a pallet assembly according to an embodiment.

FIG. 20A is a cutaway illustrating internal details of the pallet assembly of FIG. 19.

FIG. 20B is a close up FIG. 20A illustrating details of the pallet assembly of FIG. 19.

FIG. 22A is a perspective view of a guard for a module according to an embodiment.

FIG. 22B is a close up of a portion of the guard of FIG. 22A.

FIG. 22C is a close up of another portion of the guard of FIG. 22A.

FIG. 23A is circuit diagram illustrating electrical connections in a lid assembly according to an embodiment.

FIG. 23B is circuit diagram illustrating electrical connections in a module pallet assembly according to an embodiment.

FIG. 24A is a side cross sectional view of a portion of an electrochemical device according to an embodiment.

FIG. 24B is a top cross sectional view along line B-B' of the embodiment illustrated in FIG. 24A.

FIG. 24C is a schematic illustration of a detail of a sandwiched current collector according to an embodiment.

FIG. 26C is an exploded view of the housing and lid which enclose the electrochemical device of FIGS. 26A and 26B.

DETAILED DESCRIPTION

Figure 4:
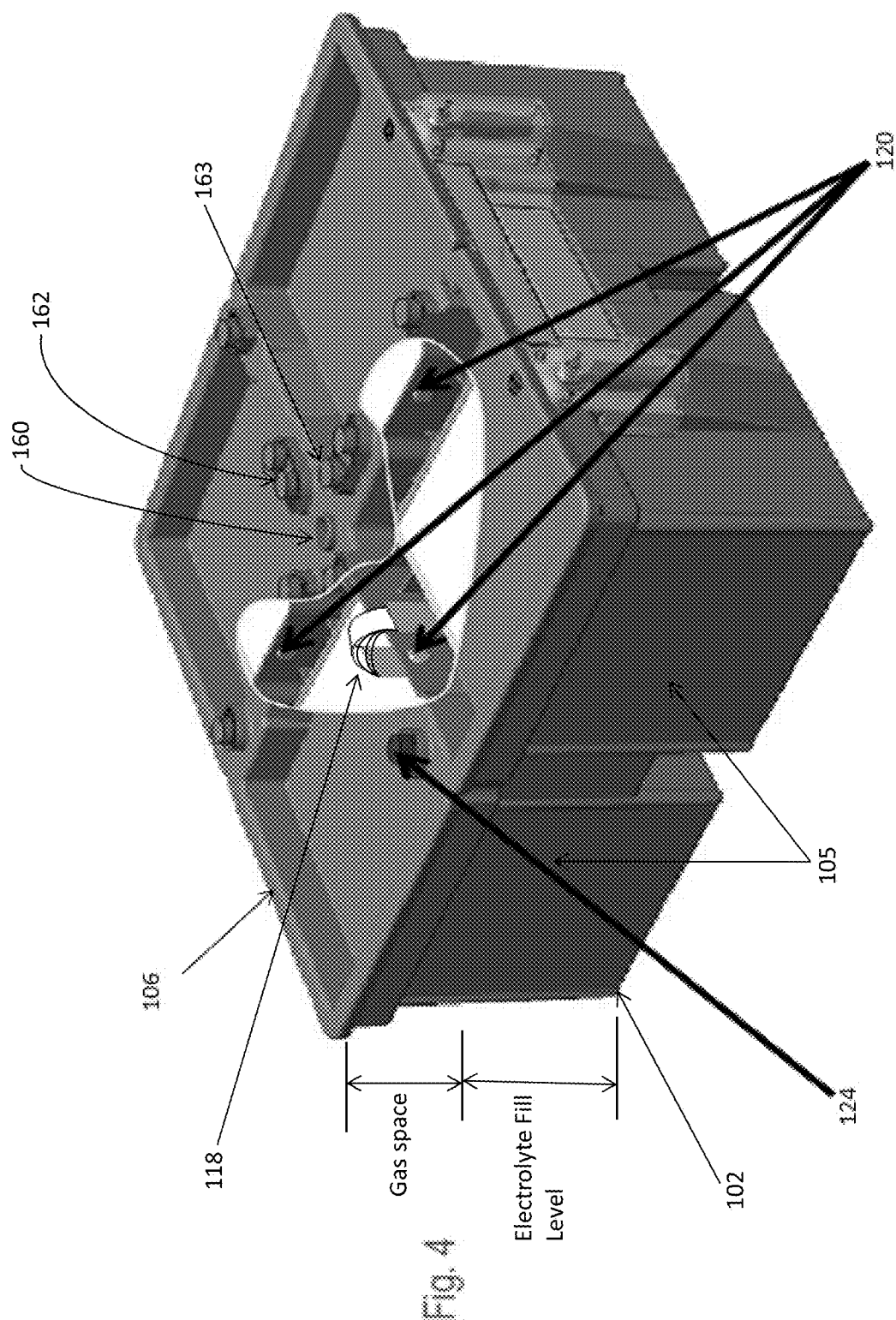
FIG. 4 is a cut away view showing details of an electrochemical device according to an embodiment.

Embodiments of the invention are drawn to electrochemical energy storage devices and systems, such as primary and secondary batteries and asymmetric/hybrid energy storage systems described below. While secondary hybrid aqueous energy storage devices described below are preferred embodiments of the invention, the invention is also applicable to any suitable electrochemical energy storage systems, such as aqueous and non-aqueous electrolyte containing batteries (e.g., having anodes and cathodes which intercalate ions from the electrolyte, including Li-ion batteries, etc.) or electrolytic capacitors (also known as supercapacitors and ultracapacitors, e.g., having capacitor or pseudocapacitor anode and cathode electrodes that store charge through a reversible nonfaradaic reaction of cations on the surface of the electrode (double-layer) and/or pseudocapacitance rather than by intercalating alkali ions).

Hybrid electrochemical energy storage devices and systems of embodiments of the present invention include a double-layer capacitor or pseudocapacitor electrode (e.g., anode) coupled with an active electrode (e.g., cathode). Such devices are also known as asymmetric electrochemical energy storage devices. In these systems, the capacitor or pseudocapacitor electrode stores charge through a reversible nonfaradaic reaction of alkali cations on the surface of the electrode (double-layer) and/or pseudocapacitance, while the active electrode undergoes a reversible faradaic reaction in a transition metal oxide that intercalates and deintercalates alkali cations similar to that of a battery, such as those described in U.S. patent application Ser. No. 13/043,787 filed on Mar. 9, 2011 and incorporated herein by reference in its entirety.

In an alternative embodiment, the electrochemical energy storage device comprises a battery in which both the anode electrode and the cathode electrode are made of materials that intercalate ions. For example, the battery may be a sodium or lithium ion based battery which includes a graphite anode and a metal oxide containing cathode, such as a layered oxide, e.g., lithium cobalt oxide, or a polyanion, e.g., lithium iron phosphate, or a spinel, e.g., manganese oxide, for example a doped or undoped cubic spinel $\lambda$-MnO$_2$-type material that intercalates lithium or sodium ions, or a NaMn$_9$O$_{18}$ tunnel structured orthorhombic material. In another alternative embodiment, the anode electrode is made of a mixture of materials, one of which intercalates ions (e.g., sodium or lithium) in a faradaic reaction and the other one of which is a capacitive electrode material which stores charge through the reversible nonfaradaic reaction of alkali metal cations on a surface of the anode electrode or the pseudocapacitive electrode material which undergoes a partial charge transfer surface interaction with alkali metal cations on a surface of the anode electrode. An example of such a mixed anode material is a mixture of "faradaic" graphite and "nonfaradaic" active amorphous or polycrystalline carbon.

Embodiments include configurations of and packaging for a manufacturable large-scale electrochemical energy storage device. Specifically, there is a need to develop a new way of containing the electrochemical energy storage device cells that is both economically feasible and high performing. Embodiments include the individual building block unit housing comprising outer walls and an integral base wall formed to include cavities separated by partitions which are preferably integral with the outer walls and base wall and a lid which may separable from the housing or attached to the housing e.g., by a hinge or the like. Individual building block unit housings include a 4-cavity configuration, each cavity containing an electrochemical energy storage device connected in series or parallel in a square "2 by 2" format. Alternative units may have more or less cavities and may be arranged in other configurations, such as 1 by 2, 1 by 3, 1 by 4, 2 by 3, 2 by 4, 3 by 4, etc. Embodiments also include a module, which is a stack of these units stacked on top of each other. The housings and lids may be made of a polymer, such as polypropylene.

Design considerations for the embodiments discussed below include the electrochemistry and electrode materials. In an embodiment, the electrodes (anode, cathode or both anode and cathode) are made from free standing pressed pellets. In an embodiment, electrochemical energy storage device is made by stacking the pellets into the housing in the proper order (e.g., current collector, cathode, separator, anode, current collector, anode, separator, cathode, and repeat). Each of the cavities in the electrochemical energy storage device may have many cells like this connected in parallel to make, for example, a 0 to 2.5 V electrochemical energy storage device. In an embodiment, each stack may then be connected in series. For a four cavity device, the device may be a 0 to 10 V system.

The housing lids may be hot plate sealed to the housing after assembly. The lid to housing interface may also be laser-sealed, sealed with adhesives, or sealed using a compression force and some type of polymeric gasketing. In an embodiment, the housing has a single pressure relief valve. Preferably, the cavities have small airways connecting them such that any excess gas that evolves anywhere in the electrochemical energy storage device can be released by the pressure relief valve. The electrical connections between stacks disposed in individual cavities of unit may be described as "jumpers" and they are formed by either directly spot welding current collection tabs together, or via a metal pass-through between the cavities. Typically, the jumpers are metal, such as stainless steel, although Al, and/or Al/stainless clad structures may also be used. Other conductive materials may also be used.

An aspect of the embodiments below is that the electrode stacks disposed inside respective individual cavities of the housings are placed in mating contact with each other by an externally applied pressure or compression force tending to compress the stacks. Absent this pressure, the electronic integrity of individual stacks of the electrochemical energy storage device may suffer and performance may be sub-standard. In particular the pressure or compression force applied to each stack places adjacent stack elements in mating contact thereby decreasing the gap between adjacent elements which tends to increase ion exchange between the anodes, the cathodes and the electrolyte present in the gap between them, as well as to increase current flow from the anodes and cathode to the adjacent current collectors. In an embodiment, the electrochemical energy storage device units (i.e., housings containing the storage device stacks) include a hole in their center to provide for a tie bar that can go through a plurality of the units stacked together in an assembly and attach to two opposing rigid plates with one positioned at a top of the units stacked together and the other positioned at a bottom of the units stacked together to thereby apply a compression force to the stacked together units when the tie bar is placed into a condition of tension. Moreover, the pressure plates are configured to transfer the tension force applied to the tie bar directly to the electrode stack. Optionally, a semi-rigid body may used to provide "spring force" on the top of the electrochemical energy storage device stack such that there is some room for electrode stack breathing during use. These stacks of electrochemical energy storage devices can then be connected in series or parallel as needed. Also, in an embodiment, stacks of electrochemical energy storage devices can be fitted onto pallet structures with integrated electronic controls and power lines to form modules. These modules can then be stacked integrated into larger systems. To allow for the facile translation of pressure from outside the case to the electrode stack, a completely flexible battery lid may be used.

Embodiments may include one or more of the following features as well as other features as described above and illustrated in the attached figures:

1) a single tie rod through the middle of the electrochemical energy storage device stack housing used to keep a stacks together,
2) the electrochemical energy storage device units (i.e., housings) are designed such that the electrode stacks inside them bear the load of the pressure imparted on the stack by the tie rod,
3) a mildly elastic member may be used as a "spring force" to maintain long term positive pressure on the stacks,
4) the housings may be assembled onto pallets with integrated electronic controls and power lines,
5) inside the electrochemical energy storage device housing, there may be single pressure relief valve and the electrochemical energy storage devices in the cavities may then be connected in series or parallel,
6) There may be an open gas pathway between the cavities, and
7) The electrochemical energy storage device cavities may be filled with a gelled liquid electrolyte (or gelled water) as a source of moisture for the electrode stacks that will not "slosh" around and affect performance.

FIGS. 1, 2 and 4 illustrate an electrochemical device 100 according to a first embodiment. As illustrated, the electrochemical device 100 includes a housing 102 that includes four cavities 104. As discussed above, the housing 102 may have more or fewer than four cavities 104. Each cavity is defined by walls 105 of the housing 102. In the embodiment illustrated in FIGS. 1, 2 and 4, each cavity 104 is bounded by two external walls 105 (walls that have a face on the periphery of the electrochemical device 100) and two internal walls or partitions 105 (walls located on the inside of the electrochemical device 100). In alternative configurations, the cavities 104 may have more or less than two external and two internal walls 105. For example, in a 3 by 3 configuration, the central cavity 104 is entirely bounded by internal walls or partitions 105, side cavities 104 (not in the corner) are bounded by one external wall and three internal walls, while the corner cavities 104 are bounded by two internal walls and two external walls. In a 1 by 3 configuration, the center cavity 104 is bounded by two internal and two external walls 105 while the two end cavities 104 are bounded by one internal wall 105 and three external walls 105.

Figure 25:
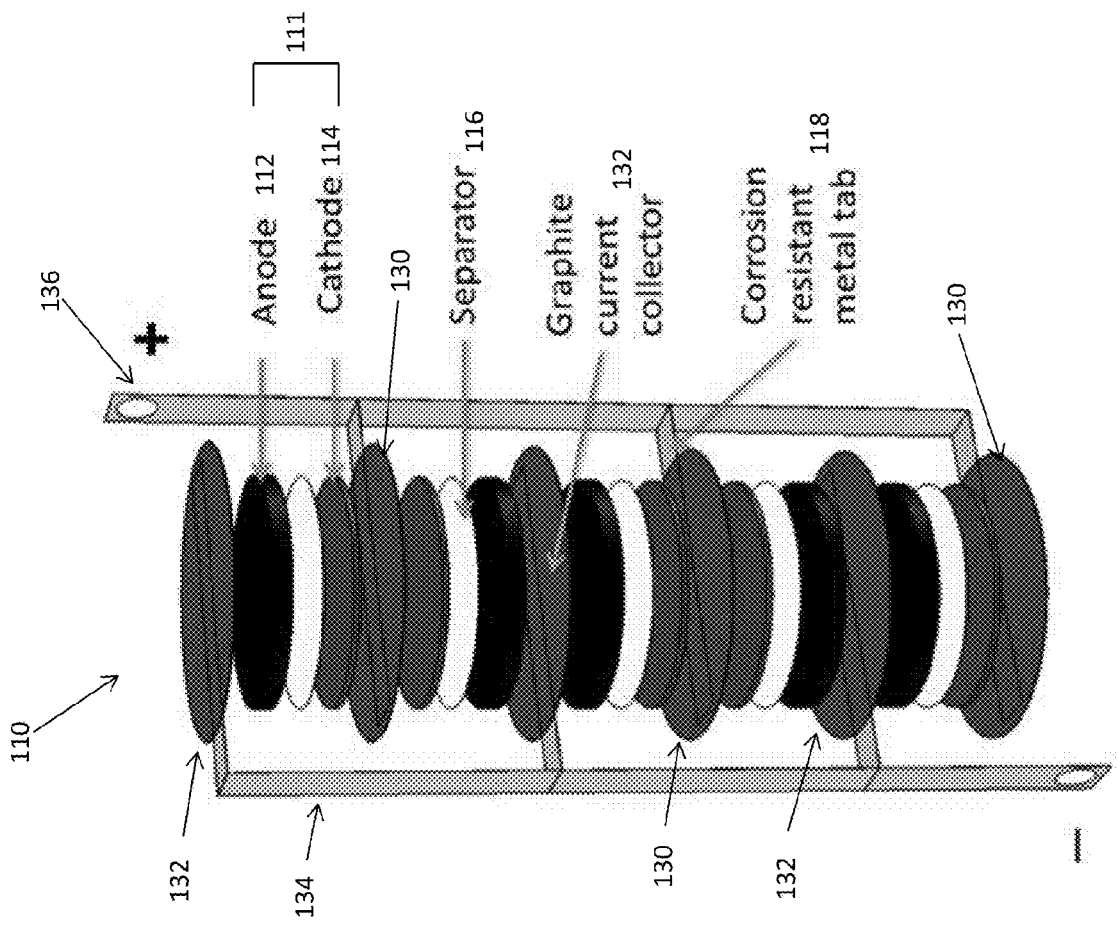
FIG. 25 is an exploded view of a stack of electrochemical cells with prismatic stacking.

Preferably, each cavity 104 includes a stack 110 of electrochemical cells 111. Each electrochemical cell 111 includes an anode 112, a cathode 114 and a separator 116 located between the anode 112 and the cathode 114. In further embodiments a hybrid or asymmetric electrochemical cell 111 may include a second anode and a second cathode separated by a second separator. The electrochemical cells 111 may be electrically connected in series or prismatically in the stack 110 of electrochemical cells 111. In a prismatic configuration, the electrochemical cells 111 in the stack 110 are connected in parallel as illustrated in FIG. 25.

Each electrochemical cell 111 further includes two current collectors 130, 132 provided to collect the current generated by the electrochemical cells 111. The current collectors 130, 132 may be made of any suitable electrically conducting material, such as carbon (e.g. graphite) or metal. In a prismatic stack 110, described for example in U.S. patent application Ser. No. 13/043,787 and illustrated in FIG. 25, pairs of electrochemical cells 102 are configured "front-to-front" and "back-to-back." The cathode current collector 130 may be located in between cathodes 114 of adjacent electrochemical cells 111. As an example, consider a prismatic stack 110 in which the first electrochemical cell 111 is in the center of the stack 110. In a first pair of cells 111 the first cathode current collector 130 is located such that a cathode electrode 114 of the first electrochemical cell 111 electrically contacts the first cathode current collector 130 and a cathode electrode 114 of a second electrochemical cell 111 also electrically contacts the first cathode current collector 130. The second electrochemical cell 111 is located adjacent to a first (cathode) side of the first electrochemical cell 111 in the prismatic stack 110.

A third electrochemical cell 111 is located adjacent to the second (anode) side of the first electrochemical cell 111 in the prismatic stack 110. The anode electrode 112 of the first electrochemical cell 111 electrically contacts a first anode current collector 132 and the anode electrode 112 of the third electrochemical cell 111 also electrically contacts the first anode current collector 132. Stacking can continue in this manner. The resulting prismatic stack 110 therefore may include a plurality of electrochemical cells 111 that are stacked in pairs, front-to-front and back-to-back, alternating adjacent anode electrodes 112 and adjacent cathode electrodes 114.

Preferably, the anodes 112, cathodes 114, separators 116 and current collectors 130, 132 are freely stacked and are not laminated to each other in the cavities 104. That is, no adhesives or binders are located between the individual components (anodes 112, cathodes 114, separators 116 and current collectors 130, 132) in the stacks 110 as are typically found in conventional laminated electrochemical cells. Instead, one embodiment of the present invention applies a longitudinal pressure force to a plurality of freely stacked electrochemical cells that forces adjacent cell elements into mating contact to improve the electrochemical reaction between the anodes and cathodes and the electrolyte that fills the cavities as well as to improve electrical contact between the current collectors corresponding anodes and cathodes to increase current flow to the current collectors.

Another embodiment is illustrated in FIGS. 24A and 24B. In this embodiment, a stack 110 of electrochemical cells is located in a cavity 104 of a housing 102 as in previous embodiments. In contrast to previous embodiments, the anode electrode 112 and/or the cathode electrode 114 may be made of two or more discrete pieces, such as 4, 6, 9 or any number of discrete pieces. As illustrated in FIG. 24B, the cathode electrode 114 includes 4 discrete pieces. In an embodiment, the area of the cathode current collector 130 when viewed from above is greater than the area of the cathode electrode pieces 114. Similarly, the area of the anode current collector 132 when viewed from above may be greater than the area of the anode electrode pieces 112.

In an aspect of this embodiment, the separator 116 includes flanges 116A around the periphery of the separator 116. The flanges 116A define one or more cavities that are configured to receive the anode/cathode electrode pieces 112, 114. In another aspect, the electrochemical storage cells 111 include a plurality of flexible, electrically conductive contacts (e.g., tabs) 118 operatively connected to the plurality of cathode and anode current collectors 130, 132. The flexible, electrically conductive contacts 118 may be affixed to one side of the cathode and anode current collectors 130, 132. In this embodiment, electrical connection to the stacks 110 of electrochemical storage cells 111 in adjacent cavities 104 in the housing 102 may be made by draping the flexible, electrically conductive contacts 118 over the walls 105 between adjacent cavities 104 and connecting the stacks 110. The stacks 110 in adjacent cavities 104 may be electrically connected in series, in parallel or combination thereof as desired. In the embodiment illustrated in FIG. 26A, discussed in more detail below, the flexible, electrically conductive contacts 118 from adjacent stacks 110 are joined together 166, such as by welding or brazing.

In an embodiment, the stack 110 of electrochemical storage cells 111 is prismatically stacked. A plurality of electrically conductive contacts (e.g., tabs) 118 operatively connected to the plurality of cathode and anode current collectors 130, 132. As in the previous embodiments, the electrically conductive contacts 118 may be affixed to one side of the cathode and anode current collectors 130, 132 as shown in FIG. 25. Alternatively, as illustrated in FIG. 24C, the electrically conductive contacts 118 may be located in between two current collectors 130 or 132 of the same type, making a sandwich structure 131.

In an embodiment, the electrically conductive contacts 118 of alternate cells 111 in the stack 110 of cells 111 are affixed to each other, such as by welding or brazing. That is, the electrically conductive contacts 118 connected to successive cathode electrodes 114/cathode current collectors 130 are connected to each other while the electrically conductive contacts 118 connected to successive anode electrodes 112/anode current collectors 132 are connected to each other. In this manner, the electrochemical cells 111 in the stack 110 can be electrically connected in parallel.

Figure 26A:
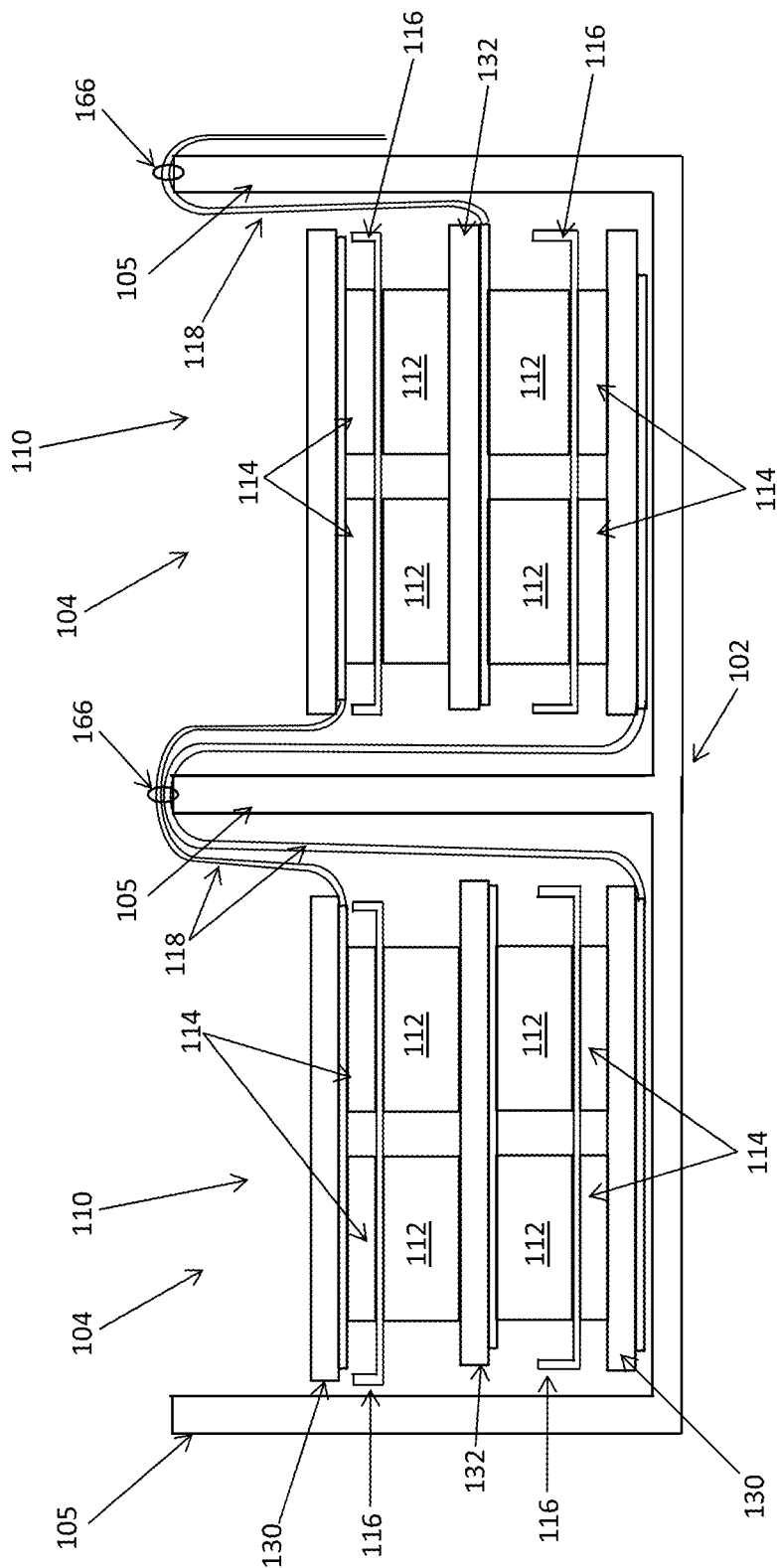
FIG. 26A is a side cross sectional view of an electrochemical storage device according to an embodiment.
Figure 26B:
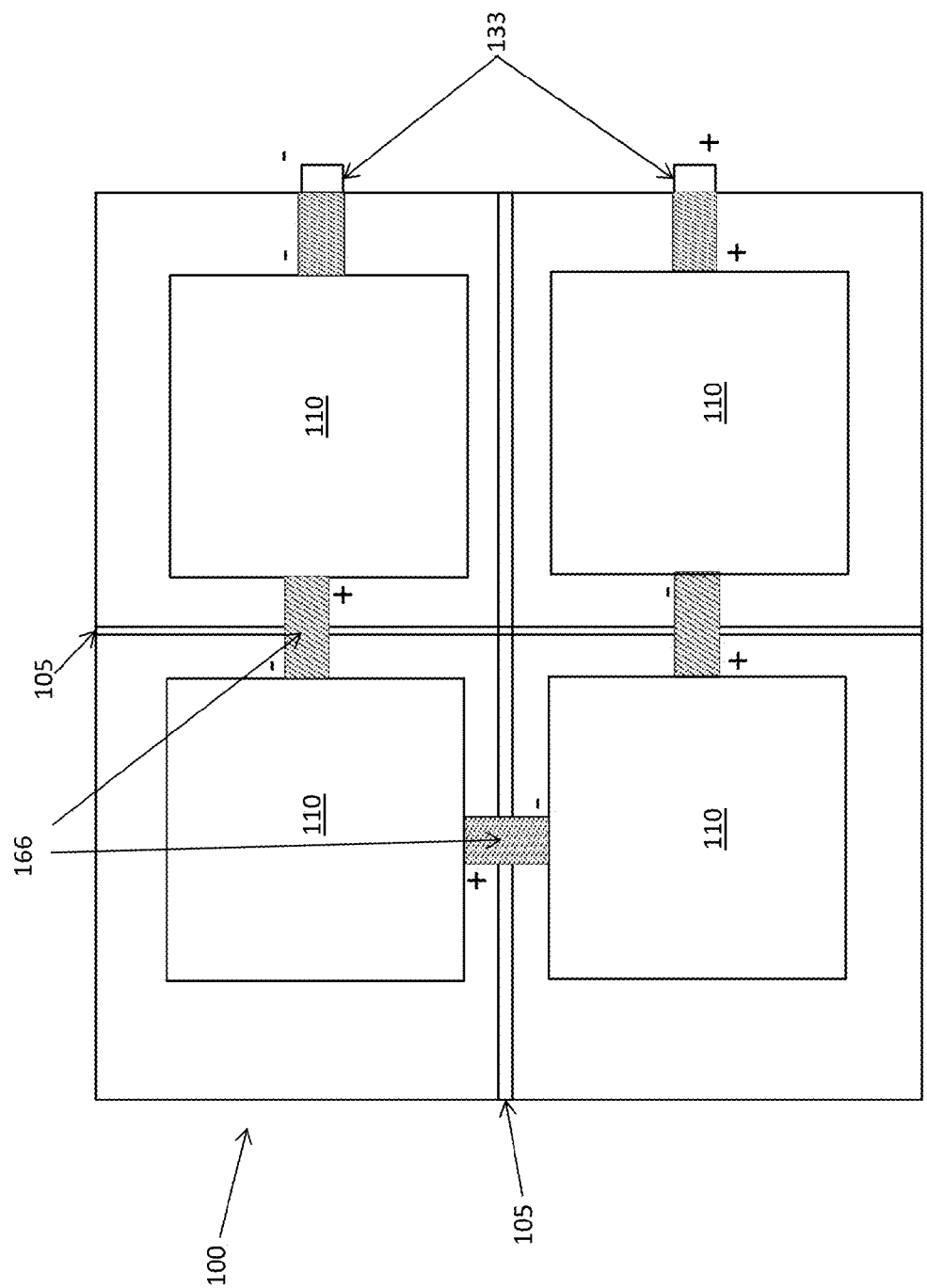
FIGS. 26B and 27 are respective top and bottom plan views of the embodiment device illustrated in FIG. 26A.

FIGS. 26A and 26B illustrate an embodiment of an electrochemical device 100 having four adjacent stacks 110 configured in a 2×2 pattern in a housing having four cavities 104 in the 2×2 pattern. As illustrated in FIG. 26B, the adjacent stacks 110 are electrically connected in series. Alternatively, adjacent stacks may be electrically connected in parallel. As discussed above, the electrical connection between adjacent stacks 110 may be made by joining the flexible, electrically conductive contacts 118 of the cell 111 of the adjacent stacks 110, such as by welding or brazing at locations 166 on top of the interior walls 105 of the housing 102. FIG. 26C is an exploded view of the housing 102 and lid 106 (with the lid removed from the housing) which enclose the stacks shown in FIGS. 26A and 26B.

In an alternative embodiment shown in FIG. 25, the prismatic stack 110 also includes two electrical buses 134, 136. One electrical bus 134 electrically connected to the anode current collectors 132 in the prismatic stack 110 and one electrical bus connected 136 to the cathode current collectors 130 in the prismatic stack 1100. In an embodiment, the electrical connection from the cathode and anode current collectors 130, 132 to the electrical buses 134, 136 is via the electrically conductive contacts 118. In this manner, the electrochemical cells 111 in the stack 110 can be electrically connected in parallel.

The electrochemical device 100 also includes a liquid or gel electrolyte (not shown) in the cavities 104 which substantially fills the cavity to immerse each electrochemical cell in electrolyte. The housing 102 of the electrochemical device 100 is preferably hermetically sealed with a lid 106 to prevent the loss of electrolyte from the electrochemical device 100 and a common gas volume is provided above each cavity between the top of each cavity and the lid to allow outgassing from all of the cavities to collect in the gas volume. In an embodiment, the lid 106 includes a hole 160 in the center which is aligned with a corresponding hole 161 that extends through the housing 102 for receiving the tie rod 206 there through. The lid 106 may also include lid cavities 107 which are recessed to ensure that a bottom surface of each cavity 107 contacts the top surface of the electrode stack in the corresponding cavity in order to transfer a pressure or compression force from pressure plates 202 through each unit in an assembly 200 when the units are stacked in an assembly, as shown in FIG. 6. As discussed in more detail below, the lid cavities 107 are preferably configured to facilitate stacking of electrochemical devices 100 in a manner that transfer the above described pressure force from one unit device to another. The housing 102 may include features to hold terminals 133 that may be connected to an outside load or to other electrochemical devices 100 as discussed in more detail below.

As illustrated in FIG. 4, the cavities 104 may be fluidly connected to each other via holes 120 in the inside walls 105 in the housing 102 forming the cavities 104. The lid 106 may include a pressure relief valve 124 configured to release gas in the event of excess gas build up during operation of the electrochemical device 100. Because all of the cavities 104 are fluidly connected via the holes 120, the lid 106 may have only a single pressure relief valve 124 for all cavities 104 in the housing 102. Also illustrated in FIG. 4 are flexible electrical connectors 118 (e.g. stainless steel or another metal) electrically connecting the electrochemical stacks 110 of a first cavity 104 with a second cavity 104 in the housing 102 of the electrochemical device 100. All of the cavities 104 in the electrochemical device 100 may be similarly connected to each other as shown in FIG. 26. The flexible electrical connectors 118 may be configured such that stacks 110 of electrochemical cells 111 within the electrochemical device 100 are in series or in parallel or a combination thereof. Additionally, the electrochemical device 100 includes at least one electrolyte port 162 in the lid 106. Electrolyte may be added to the electrochemical device 100 via the electrolyte ports 162. The electrolyte ports 162 may be covered with caps 163 to prevent spillage of electrolyte out of the electrolyte ports 162.

In a method of making the electrochemical device 100, the lid 106 is sealed onto the housing 102 after the solid components (e.g. the anode electrodes 112, cathode electrodes 114, separators 116, anode current collectors 132 and cathode current collectors 130) are stacked in the housing 102. Then, the device 100 is evacuated via the electrolyte ports 162 to remove any undesired gases. After evacuation, the cavities 104 of the electrochemical device 100 are partially filled with electrolyte, leaving a gas space or volume above the electrolyte in the cavities 104.

FIGS. 3 and 5-9B illustrate an assembly 200 comprising a plurality of (e.g. a stack) of electrochemical device units 100 stacked one above another according to another embodiment. As illustrated in FIG. 3, the housings 102 and lids 106 of the electrochemical device units 100 are configured such that the electrochemical device units 100 can be stably stacked upon each other. That is, the lid cavities 107 are dimensioned to receive the bottom surface and the bottom parts of the walls 105 of the cavities 104 of the housing 102 of the electrochemical device unit 100 stacked on top.

As illustrated in FIG. 5, in an embodiment, the electrochemical unit 100 may include one or more pass through electrical connectors 140, e.g., one connector 140 associated with each terminal 133 shown in FIG. 26B or with each power bus 134, 136 shown in FIG. 25. The pass through electrical connector 140 is a vertically oriented (i.e., it has a longitudinal axis parallel to the stacking direction) electrically conducting structure, e.g., the male portion of a standard electrical power connector molded into the housing, but other orientations and or locations are usable without deviating from the present invention. Alternately the connector 140 may comprise the female portion of a standard electrical power connector molded into the housing. Otherwise the connector 140 may comprise electrical elements molded into the housing or installed in the housing that are configured to mate with the male or female portion of a power connector to electrically interconnect the electrochemical device unit 100 to another electrochemical device unit 100 or a power load as may be the case. Accordingly the stacks 110 of electrochemical cells 111 housed within the electrochemical device unit 100 can be electrically connected with other electrical elements using one or more terminals 133 described above by an electrical connector 140. In an embodiment, the pass through connectors 140 of each of the electrochemical device units 100 in the assembly 200 are electrically connected to the pass through connectors of the adjacent electrochemical device units 100 in the assembly 200 to either charge or discharge the entire assembly 200 as a unit. These connections may be made in series or in parallel and alternatively can be made of, such as with wires 141 affixed to the terminals 133 or connectors 140 as shown in FIG. 6.

The pass through connectors 140/terminals 133 are located within the housing 102 and therefore protected by the housing 102. That is, the housing 102 provides a "shroud" 143 surrounding the vertically oriented pass through connectors 140/terminals 133 which protect the pass through connectors 140/terminals 133 and the underlying electrochemical devices 100 during handling of the assembly 200. In contrast, the use of horizontal, i.e. protruding, terminals may risk puncture with adjacent electrochemical cells 100 during handling of the assembly 200. In an embodiment, the pass through connector 140 is held in place with a push retainer 142. To protect the housing 102 and further secure the push retainer 142, a washer 144, such as a flat washer or lock washer, may be provided on one side of the housing 102, and a seal 146, such as a silicone rubber seal, may be provided on the other side of the housing 102.

The assembly 200, as illustrated in FIG. 6, may include pressure plates 202 at the top and bottom of the stack of electrochemical devices 100. In an embodiment, the pressure plates 202 at the top and the bottom of the stack of electrochemical devices are identical, which simplifies assembly and may save on costs. The pressure plates 202 may have free standing feet 204 which provide space between the pressure plates 202 and adjacent structures such as a support pallet and/or module lid discussed in more detail below. The pressure plates 202 may also include a through hole 203 (see FIG. 9A) configured to accept a binding member 206, discussed in more detail below, and flanges 205 configured to help center the electrochemical devices 100 on the pressure plates 202. The pressure plates 202 may also includes ribs 201 for added strength and to aid in aligning the pressure plates to apply a pressure load at the desired locations.

As discussed above, the components of the electrochemical cells 111 are freely stacked. However, the inventors have discovered that the electrochemical devices 100 are more robust when the stacks 110 of electrochemical cells 111 are under pressure. Therefore, as discussed in more detail below, assemblies 200 of electrochemical devices 100 are configured such that the stacks 110 of electrochemical cells 111 are assembled such that the cells 111 are under pressure. Preferably, the stacks 110 bear most or all (e.g. at least 90%, such as 90-100%, e.g. 95-99%) of the compressive loading. That is, it is preferable that the housings 102 and the lids 106 bear little or no compressive loading (e.g. 0-10%, such as 1-5%). That is, the housing 102 and the lid 106 are made of a flexible material (e.g. plastic, such as polypropylene) that bends or otherwise plastically deforms under a pressure/load applied by the pressure plates and the weight of the electrochemical device units stacked one above another.

One or more elastic elements 208 may be provided between the pressure plates 202 and the electrochemical devices 100 in the assembly 200. Elastic elements 208 (see FIGS. 6, 7A, 7B and 7C) may be provided between the bottom pressure plate 202 and the stack of electrochemical devices 100, between the top pressure plate 202 and the stack of electrochemical devices 100 or between both pressure plates 202 and the stack of electrochemical devices 100. The elastic element 208 may be made of a springy material, such as silicone or rubber.

Figure 27:
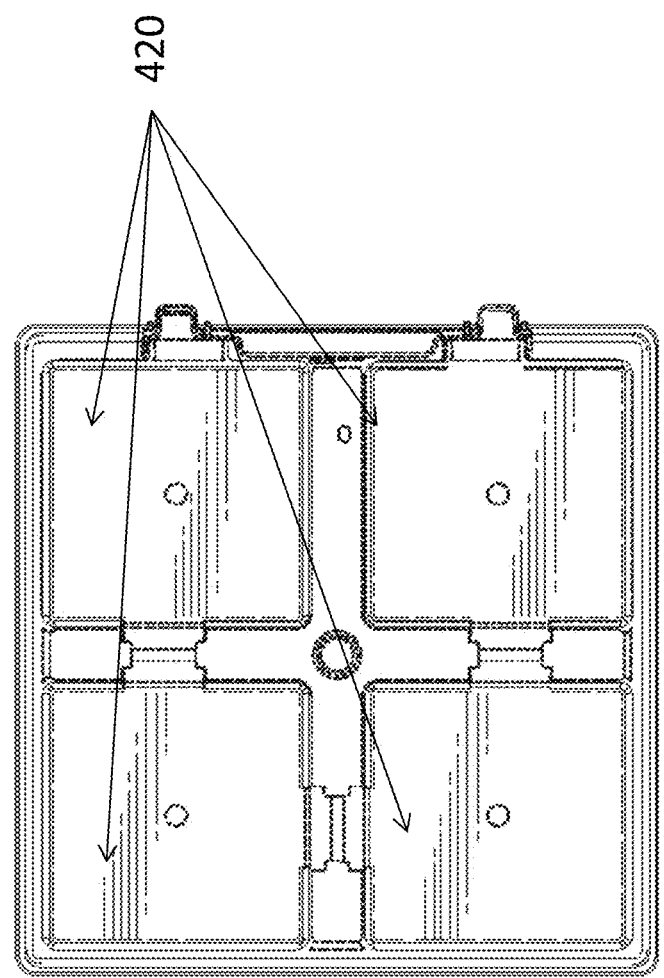

A binding member 206 (such as the tie rod illustrated in FIG. 7C, a cable or a spring), may be provided through the holes 160 in the lids 106 and holes 161 in the housings 102 of the electrochemical devices 100. The binding member 206 also passes through the pressure plates 202 (FIGS. 8A-8C). The binding member 206 may be secured to the pressure plates with tightening/securing members 207, such as a nut installed on a threaded end of the binding member 206 or the like tension the binding member 206. The tension in the binding member is used to force each pressure place into mating contact with the corresponding top and bottom electrochemical units 100 or the assembly or stack 200. Thus tension in the binding member 206 is transferred to the pressure plates 202 which transfer the pressure force to the top and bottom electrochemical device units 100 in the assembly 200 which in turn transfer the pressure force to each of the remaining electrochemical device units 100 in the assembly 200. More specifically, the pressure plates 202, the housing bottom surfaces 420 shown in FIG. 27 and lid cavities 107 are configured to align and interlock the units 100 and to transfer the pressure force applied to the pressure plates directly to the electrode stacks in each cavity such that tensioning the binding member 206 applies a compression force to each of the electrode stacks included in the assembly 200. Pressure may be applied to the assembly 200 by tightening the tightening/securing members 207, thereby causing the pressure plates to apply pressure or clamping force to the stack of electrochemical devices 100 in the assembly 200. When one or more elastic elements 208 are included in the stack, the elastic elements 208 deform in response to the pressure force and tend to more uniformly distribute the pressure load over the bearings surfaces, specifically the lid cavities 107 and the housing bottom surfaces 420 and to more uniformly distribute the pressure force to each of the four load bearing surfaces of the lid cavities 107 and the bottom bearing surfaces 420. In an alternative embodiment, the binding member 206 has a fixed length and the pressure or clamping force is determined by the thickness of the elastic element(s) 208. Alternately the binding member 206 has a fixed length and the pressure or clamping force is applied by one or more compression springs disposed between the opposing pressure plates 202. A removable eye nut 210 may be affixed to the top of the binding member 206 to assist in lifting and otherwise handling the assembly 200.

FIG. 8A illustrates some dimensions that may be used to characterize the assembly 200. The distance 208x represents the thickness of the elastic element 208 (non-deflected). The distance 207x is measured from the bottom of a non-deflected elastic element 208 to the top of the bottom pressure plate 202. The distance 206x is the distance between the top and bottom pressure plates 202. In various embodiments the pressure force applied may be proportional to ratio of the thickness of non-deflected and the thickness of the elastic member element 208 after a pressure force is applied, i.e. the deflected thickness.

FIG. 10 illustrates a module 300 of assemblies 200 according to an embodiment. In this embodiment, assemblies 200 are mounted on a base, such as a pallet 302. As illustrated, the module 300 may include twelve assemblies 200 in a 3 by 4 configuration. However, the module 300 may include any number of assemblies 200, such as 1 by 2, 1 by 3, 1 by 4, 2 by 3, 2 by 4, 3 by 5, etc. The module 300 preferably includes a module lid assembly 306, discussed in more detail below and a guard 308 that surrounds and protects the assemblies 200.

Figure 11:
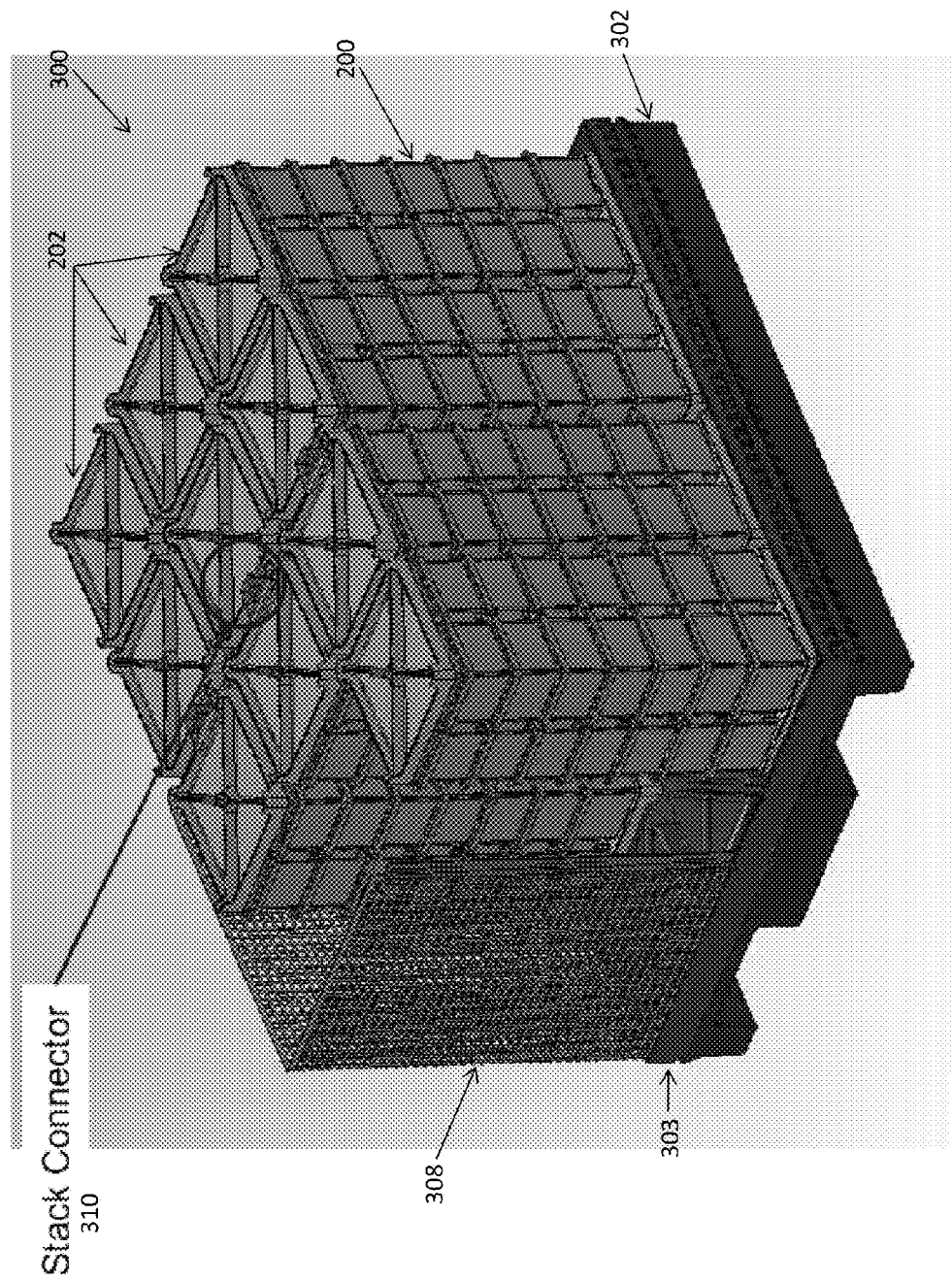
FIG. 11 is a cutaway view of the module of FIG. 10.
Figure 12:
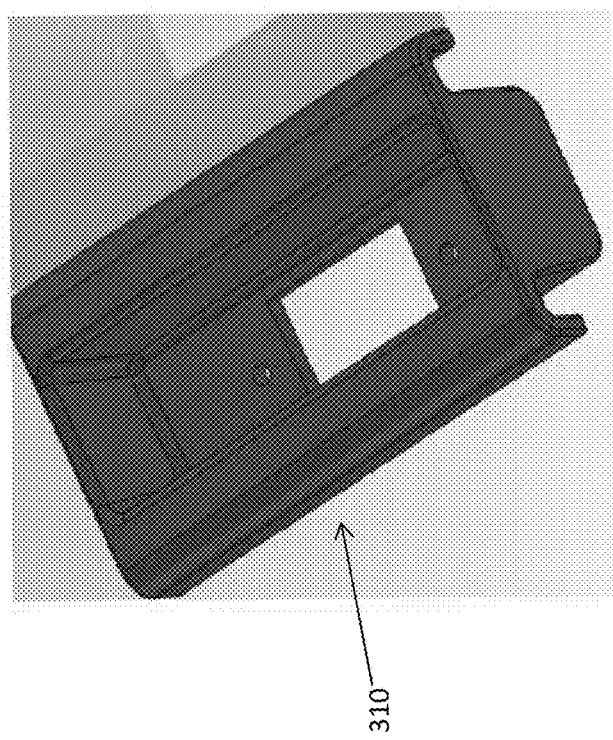
FIG. 12 is a perspective view illustrating details of a component illustrated in FIG. 11.

FIG. 11 illustrates an embodiment of a module 300 with the lid assembly removed. Adjacent assemblies 200 may be mechanically clamped to each other with one or more mechanical stack connectors 310, illustrated in more detail in FIG. 12. In an embodiment, the stack connectors 310 are affixed to adjacent pressure plates 202.

FIG. 13 illustrates a cross section through a module 300. The module 300 includes a module frame 303 located on a pallet 302. Frame 303 is configured to receive the assemblies 200. That is, the module frame 303 includes trenches to receive the feet 204 and the ribs 201 of the pressure plates 202 and thereby provide a more stable support for the assemblies 200. The module 300 also includes an actuator/push rod 312 and a module to module connector 314, for mechanically attaching modules together, as described in more detail below. The actuator/push rod 312 and module to module connector 314 allow adjacent modules 300 to be mechanically connected together to form an integrated electrochemical storage system comprising a plurality of electrochemical assemblies 200.

FIGS. 14-18 illustrate details of a lid assembly 306 for a module 300 according to an embodiment. In an embodiment, the lid assembly 306 includes a cover 307 and a lid assembly frame 316 (FIG. 15). The lid assembly frame 316 includes one or more space protectors 318 and contactors 320 which make physical connection with the lid assembly cover 307 of the module lid assembly 306 and aid in properly seating the lid assembly cover 307 on the lid assembly frame 316. FIG. 15 also illustrates the placement of the actuator rod 312 in the assembly frame 316 of the lid assembly 306.

FIG. 16 illustrates top and bottom views of the lid assembly 306. As illustrated in FIG. 16, the lid assembly 306 includes recesses 317 configured to receive pressure plates 202 of individual assemblies 200 therein. FIG. 16 also illustrates the placement of the actuator rod 312, module to module connector 314, stack connectors 310, space protectors 318 and contactors 320.

FIGS. 17A, 17B and 18 provide details of a method of connecting modules with the mechanical module to module connector 314. The mechanical module to module connector 314 includes male plug locator 326 and two connector pins 322. The connector pins 322 are attached to the ends of connector blocks 324. In alternative embodiments, more or fewer connector pins 322 are used. The connector blocks 324 are operably connected to the actuator/push rod 312. In an embodiment, after all modules 300 are in place and aligned, a cam or protrusion (not shown) on the container door (not shown) contacts the last actuator/push rod 312 and all the connectors 314 are shuttled to the left (as illustrated), causing the connector pins 322 on one module to engage the female receptacles 323 on an adjacent module. FIG. 18, illustrates the male locating plug 326 on one module approaching the female locating socket 328. When these features are fully engaged and the modules 300 are positioned end to end, the actuator/push rod 312 is actuated, forcing the connector blocks 324 and connector pins 322 into the female receptacles 323.

Figure 21:
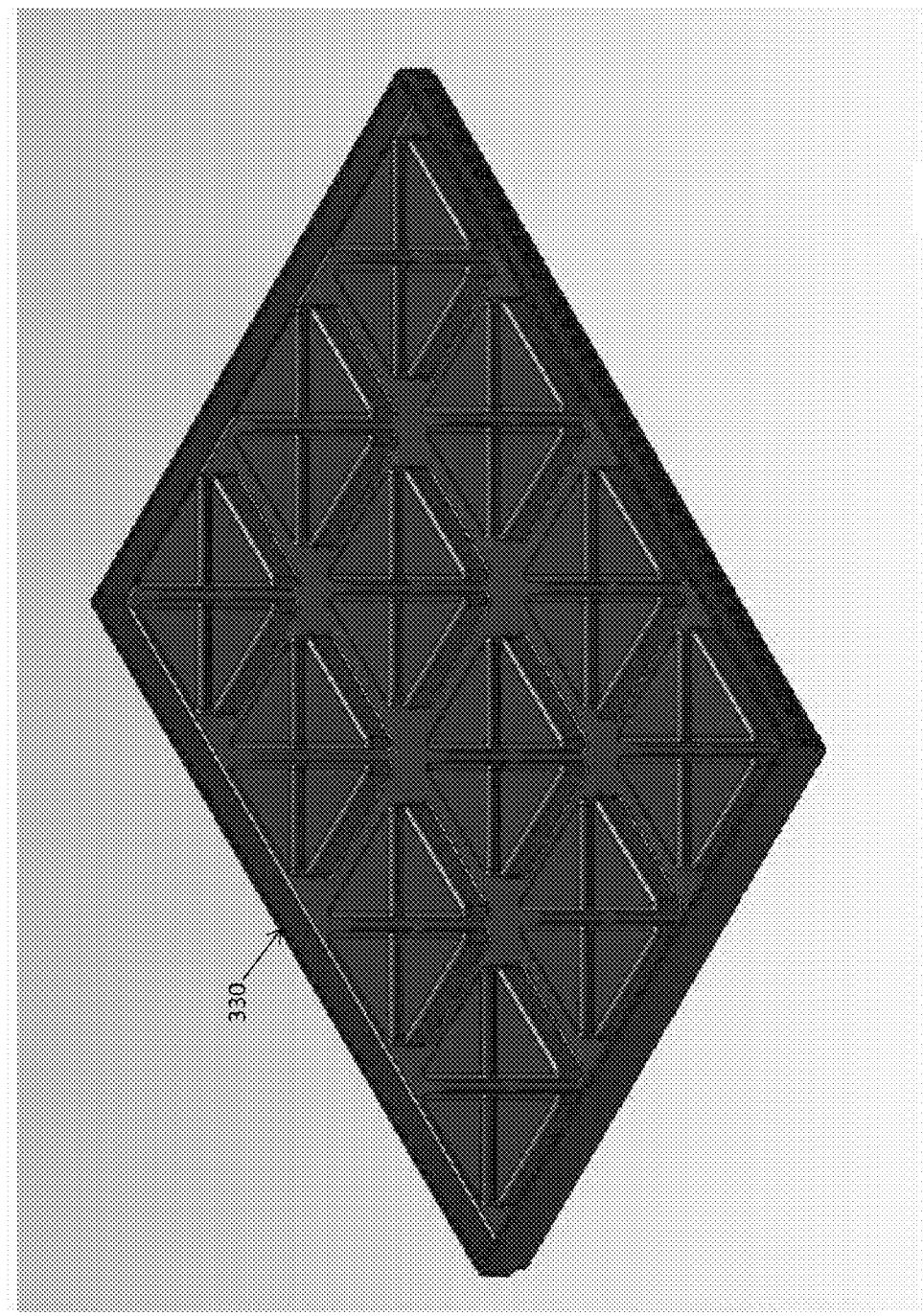
FIG. 21 is a perspective view of a nest tray of a pallet assembly according to an embodiment.

FIGS. 19-21 illustrate details of an embodiment of a pallet assembly 302 for use with a module 300. In this embodiment, the pallet assembly 302 includes a pan 329 and a nest tray 330 located on the pan 329. The pan 329 and the nest tray 330 may be made of any suitable material, such as polyethylene. The nest tray includes recesses 317 configured to receive pressure plates 202 while the pan 329 includes fork tunnels 334 (FIG. 20A) configured to receive the forks of a fork lift truck. As illustrated in FIGS. 20A and 20B, the nest tray 330 also includes reinforcing structures 332 (e.g. steel bars, rods, plastic flanges etc.) to strengthen the nest tray 330 and to stabilize the modules 300. The reinforcing structures 332 may be provided in both lateral and longitudinal orientations to strengthen the nest tray 330.

FIGS. 22A-22C illustrate a guard 308 for a module according to an embodiment. In an embodiment, the guard 308 is a perforated enclosure made of steel, such as perforated 16 gauge steel. However, the guard 308 may be made of any suitable material. The guard 308 may be assembled in sections. In an embodiment, adjacent sections of the guard 308 are attached to each other with a guard interlock channel 309 (FIG. 22C). The guard 308 may be affixed to the nest tray 330 by inserting a portion of the guard into a slot 336 in the nest tray 330 (FIG. 22B).

FIGS. 23A and 23B are electrical circuit diagrams that illustrate the internal 338 assembly 200 electrical connections in each module 300 and external 340 inter-module 300 electrical connections. The electrical connections may be located in a module lid assembly 306 and/or in a pallet assembly 302, respectively, according to an embodiment. As illustrated in FIG. 23A, the module lid assembly 306 may include both internal and external electrical connections 338, 340. In this embodiment, the module 300 on the pallet assembly 302 only includes internal electrical connections 338 between the assemblies. In alternative embodiments, the pallet assembly 302 includes internal and external electrical connections 338, 340 while the module lid assembly includes only internal electrical connections 338. In other embodiments, both the module lid assembly 306 and the pallet assembly 302 include internal and external electrical connections 338, 340.

In the embodiment illustrated in FIG. 23B, the electrochemical devices 100 are connected in series in the assembly 200. Only one assembly 200 and one connector 342 are illustrated for clarity. In an embodiment, each connector 342A may connect four assemblies 200 in series. The module 300 may include three connectors 342A for 12 assemblies. The module lid assembly 306 includes 3 mating connectors 342B, each of which may be electrically connected a respective assembly 200 connector 342A. In this embodiment, the module 300 may include total of 12 assemblies 200. However, as discussed above, the modules 300 may include more or fewer assemblies 200 than 12 and may include more or fewer connectors 342. Further, the connectors 342A, 342B with four electrical connections are for illustration only. Other connectors 342 with more of fewer electrical connections may be used as well. Connectors 342A, 342B may include, but are not limited to, Anderson Power Products Blind Mate series BMHSG-R and -P type connectors or other similar connectors. The pallet assembly 302 may contain charge control/power electronics for charging each module 300 as a whole or for charging individual assemblies 200 or for charging individual electrochemical device units 100 or a combination thereof.

The assemblies 200 in the module may be connected together either in series or in parallel, depending on the desired use of the module 300. The series/parallel connections may be located in either the module lid assembly 306 or the pallet assembly 302. If the series/parallel connections are provided in the module lid assembly 306, then the module 300 can be easily reconfigured by simply replacing a first module lid assembly 306 with one connection configuration with a second module lid assembly 306 having a different connection configuration. In one example, as illustrated in FIGS. 23A and 23B, the assemblies 200 are connected in parallel via connectors 342A in the pallet assembly 302 while the modules 300 are connect to each other in series via the lid 106.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. An energy storage assembly, comprising:
    a plurality of electrochemical device units stacked one above another between opposing pressure plates;
    wherein each of the plurality of electrochemical device units comprises a housing and a lid forming a plurality of cell cavities with each of the plurality of cell cavities filled with a plurality of electrochemical storage cells,
    wherein each of the plurality of electrochemical storage cells comprises:
        an anode electrode;
        a cathode electrode; and
        a separator located between the anode electrode and the cathode electrode; and
    wherein each of the housing and the lid comprises non-load bearing opposing external surfaces of each cell cavity; and
    a binding member interconnecting the opposing pressure plates;
    wherein when the binding member is placed in a condition of tension, the non-load bearing opposing external surfaces of each cell cavity impart a pressure to each the plurality of electrochemical storage cells such that the storage cells bear a load of the pressure;
    wherein the anode and cathode electrodes of the electrochemical storage cells bear at least 90 percent of the loads applied to the energy storage assembly.

2. The assembly of claim 1, wherein each of the plurality of electrochemical cells further comprises:
    an anode current collector disposed to collect current from the anode electrode of each of the plurality of electrochemical storage cells; and
    a cathode current collector disposed to collect current from the cathode electrode of each of the plurality of electrochemical storage cells.

3. The assembly of claim 2, further comprising:
    first electrically conductive contacts connecting a plurality of the anode current collectors; and
    second electrically conductive contacts connecting a plurality of the cathode current collectors.

4. The assembly of claim 3, wherein the storage cells are electrically connected in parallel and configured in a prismatic configuration.

5. The assembly of claim 3, wherein:
    the first electrically conductive contacts are joined together and electrically connected to a positive terminal exposed outside of the housing and the second electrically conductive contacts are joined together and electrically connected to a negative terminal exposed outside of the housing; and
    the first and the second electrically conductive contacts comprise flexible electrically conductive contacts which electrically connect stacks of the storage cells located adjacent to the cell cavities by extending over the walls between the adjacent cell cavities.

6. The assembly of claim 1, wherein the plurality of the electrochemical storage cells comprise hybrid devices.

7. The assembly of claim 6, wherein the cathode electrode comprises an alkali ion intercalation material and the anode electrode comprises a pseudocapacitive or electrochemical double layer capacitive material.

8. The assembly of claim 6, wherein the anode electrode comprises a mixture of materials one of which intercalates ions in a faradaic reaction and the other one of which is a pseudocapacitive or electrochemical double layer capacitive material.

9. The assembly of claim 1, wherein the plurality of electrochemical storage cells comprise battery cells in which the anode electrode and the cathode electrode intercalate ions.

10. The assembly of claim 1, wherein:
    the opposing pressure plates comprises upper and lower opposing pressure plates;
    the plurality electrochemical device units are stacked one above another between the opposing upper and lower pressure plates;
    each of the housing and the lid comprises non-load bearing opposing external surfaces located above and below of each cell cavity; and
    the binding member comprises a rod which extends through holes in the upper pressure plate, in the housing and the lid of each of the plurality of electrochemical device units, and in the lower pressure plate.

11. An method of making an energy storage assembly, comprising:
    providing a plurality of electrochemical device units comprising a housing and a lid forming a plurality of cell cavities with each of the plurality of cell cavities filled with a plurality of electrochemical storage cells;
    wherein:
    each of the plurality of electrochemical storage cells comprises:
        an anode electrode;
        a cathode electrode; and
        a separator located between the anode electrode and the cathode electrode; and
    each of the housing and the lid comprises non-load bearing opposing external surfaces of each cell cavity;
    stacking the plurality electrochemical device units between opposing pressure plates;

interconnecting the opposing pressure plates with a binding member; and placing the binding member in a condition of tension such that the non-load bearing opposing external surfaces of each cell cavity impart a pressure to each the plurality of electrochemical storage cells such that the storage cells bear a load of the pressure;

wherein the anode and cathode electrodes of the electrochemical storage cells bear at least 90 percent of the loads applied to the energy storage assembly.

12. The method of claim 11, wherein each of the plurality of electrochemical cells further comprises:

an anode current collector disposed to collect current from the anode electrode of each of the plurality of electrochemical storage cells; and a cathode current collector disposed to collect current from the cathode electrode of each of the plurality of electrochemical storage cells.

13. The method of claim 12, further comprising:

first electrically conductive contacts connecting a plurality of the anode current collectors; and second electrically conductive contacts connecting a plurality of the cathode current collectors.

14. The method of claim 13, wherein the storage cells are electrically connected in parallel and configured in a prismatic configuration.

15. The method of claim 13, wherein:

the first electrically conductive contacts are joined together and electrically connected to a positive terminal exposed outside of the housing and the second electrically conductive contacts are joined together and electrically connected in series to a negative terminal exposed outside of the housing; and the first and the second electrically conductive contacts comprise flexible electrically conductive contacts which electrically connect stacks of the storage cells located adjacent to the cell cavities by extending over the walls between the adjacent cell cavities.

16. The method of claim 11, wherein the plurality of the electrochemical storage cells comprise hybrid devices.

17. The method of claim 16, wherein the cathode electrode comprises an alkali ion intercalation material and the anode electrode comprises a pseudocapacitive or electrochemical double layer capacitive material.

18. The method of claim 16, wherein the anode electrode comprises a mixture of materials one of which intercalates ions in a faradaic reaction and the other one of which is a pseudocapacitive or electrochemical double layer capacitive material.

19. The method of claim 11, wherein the plurality of electrochemical storage cells comprise battery cells in which the anode electrode and the cathode electrode intercalate ions.

20. The method of claim 11, wherein:

the opposing pressure plates comprises upper and lower opposing pressure plates;

the plurality electrochemical device units are stacked one above another between the opposing upper and lower pressure plates;

each of the housing and the lid comprises non-load bearing opposing external surfaces located above and below of each cell cavity; and the binding member comprises a rod which extends through holes in the upper pressure plate, in the housing and the lid of each of the plurality of electrochemical device units, and in the lower pressure plate.

* * * * *